United States Patent [19]

Beckley

[11] 3,802,727
[45] Apr. 9, 1974

[54] MOTOR VEHICLE INJURY AND DAMAGE PREVENTION SYSTEM

[75] Inventor: Addison S. Beckley, Short Hills, N.J.
[73] Assignee: VICOM/ASC
[22] Filed: Feb. 22, 1971
[21] Appl. No.: 117,588

Related U.S. Application Data

[63] Continuation-in-part of Ser. No. 35,720, May 8, 1970, Pat. No. 3,702,711.

[52] U.S. Cl.................................. 293/60, 293/71 R
[51] Int. Cl.......................................... B60r 19/08
[58] Field of Search ............ 114/219; 161/159, 160, 161/161; 213/1 A, 221; 188/1 C, 268; 293/1, DIG. 2, 60, 62, 63, 64, 70, 71 R, 88, 95, 8

[56] References Cited
UNITED STATES PATENTS

| | | | |
|---|---|---|---|
| 2,578,068 | 12/1951 | Johnson | 293/63 |
| 2,757,147 | 7/1956 | Pooley | 260/25 |
| 3,216,593 | 11/1965 | Reuter et al. | 213/45 |
| 3,447,794 | 6/1969 | Sudyk | 267/1 |
| 3,610,609 | 10/1971 | Sobel | 267/140 |

Primary Examiner—Gerald M. Forlenza
Assistant Examiner—Robert Saifer
Attorney, Agent, or Firm—McGlew and Tuttle

[57] ABSTRACT

A motor vehicle damage and injury preventing system is disclosed. The system is based upon shock-absorbing bumpers extending over substantially the entire flattened front and rear ends of a specially designed vehicle and made up of a relatively thin sheet of compressible, rigid but bendable, shock-absorbing, impact-resistant material on the outer face of which is a relatively thick mass of cellular shock-absorbing plastic material. Typically a second relatively thin sheet of the impact-resistant material is provided on the outer portion of the cellular shock-absorbing plastic material and a second relatively thick mass of the cellular shock-absorbing plastic material is provided on the outer portion of this second sheet. In this way the second sheet can move inwardly and distribute the force of impacts during collisions over the entire area of the cellular plastic behind it and also over the entire flattened end of the vehicle.

The body of the motor vehicle is preferably made from relatively thin sheet-like compressible, rigid but bendable, shock-absorbing, impact-resistant plastic material of the same general type as that used as the rigid elements in the bumpers. Other novel features of the disclosure include special interior crash pads of cellular shock-absorbing plastic material placed in front of and close to the occupants and reaching to roughly the levels of their lower faces in such a way as not to interfere unduly with their freedom of action or reduce their range of vision, means for preventing undesired sagging of the cellular plastic shock-absorbing elements of the bumpers, means for restraining rocking and bending of the bumpers during certain types of collisions, and means for off-setting the high inertia of engine blocks and other heavy components during collisions.

13 Claims, 12 Drawing Figures

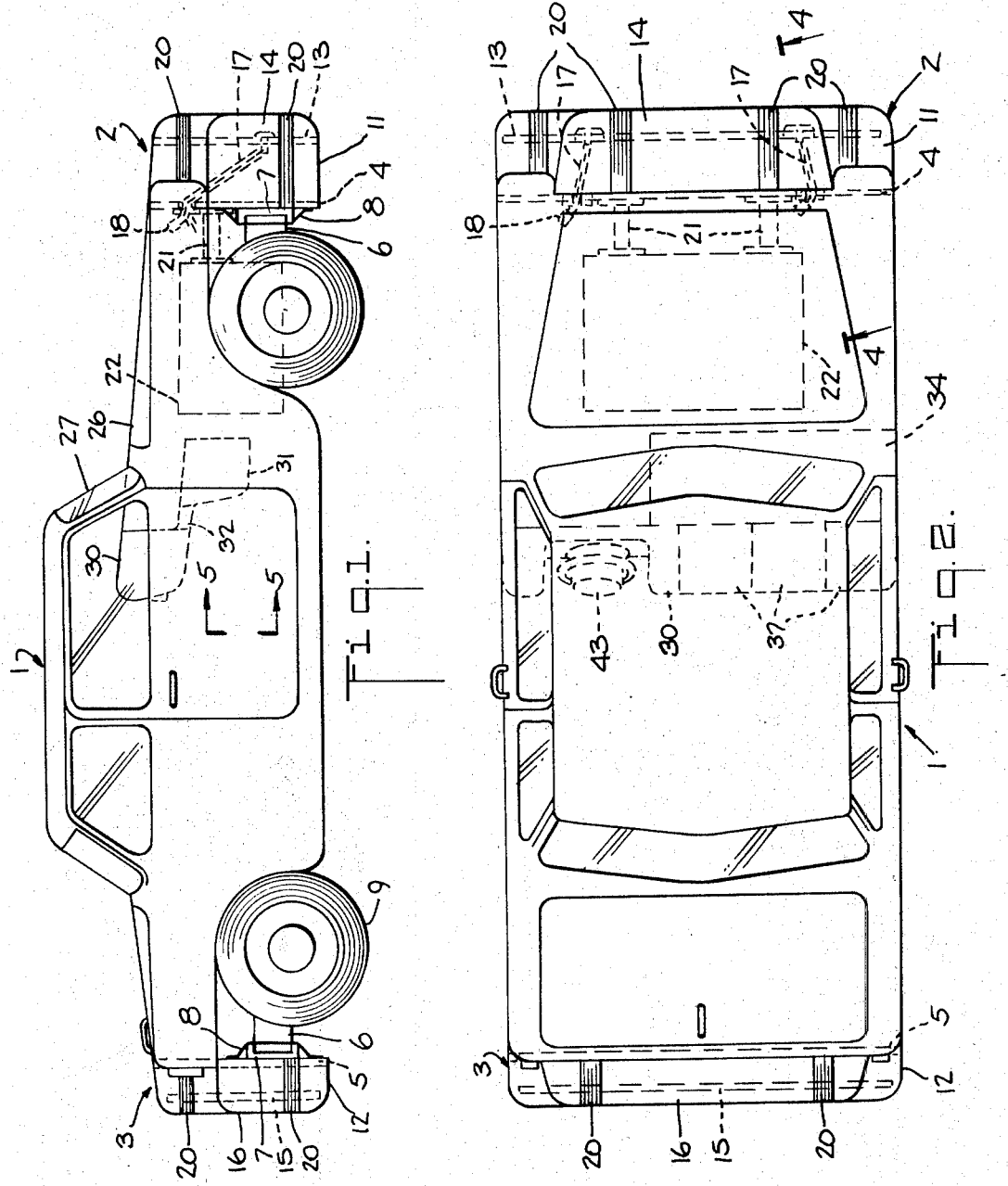

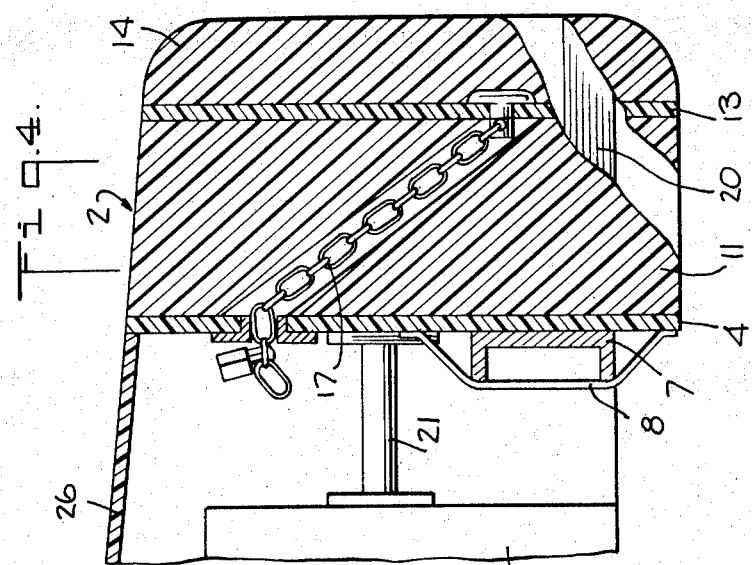
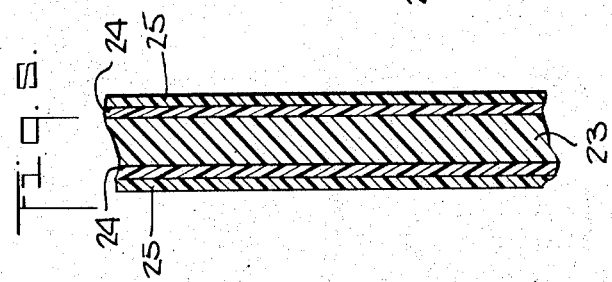
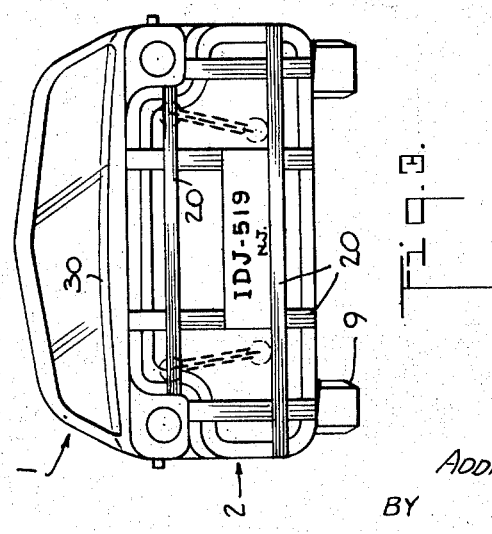

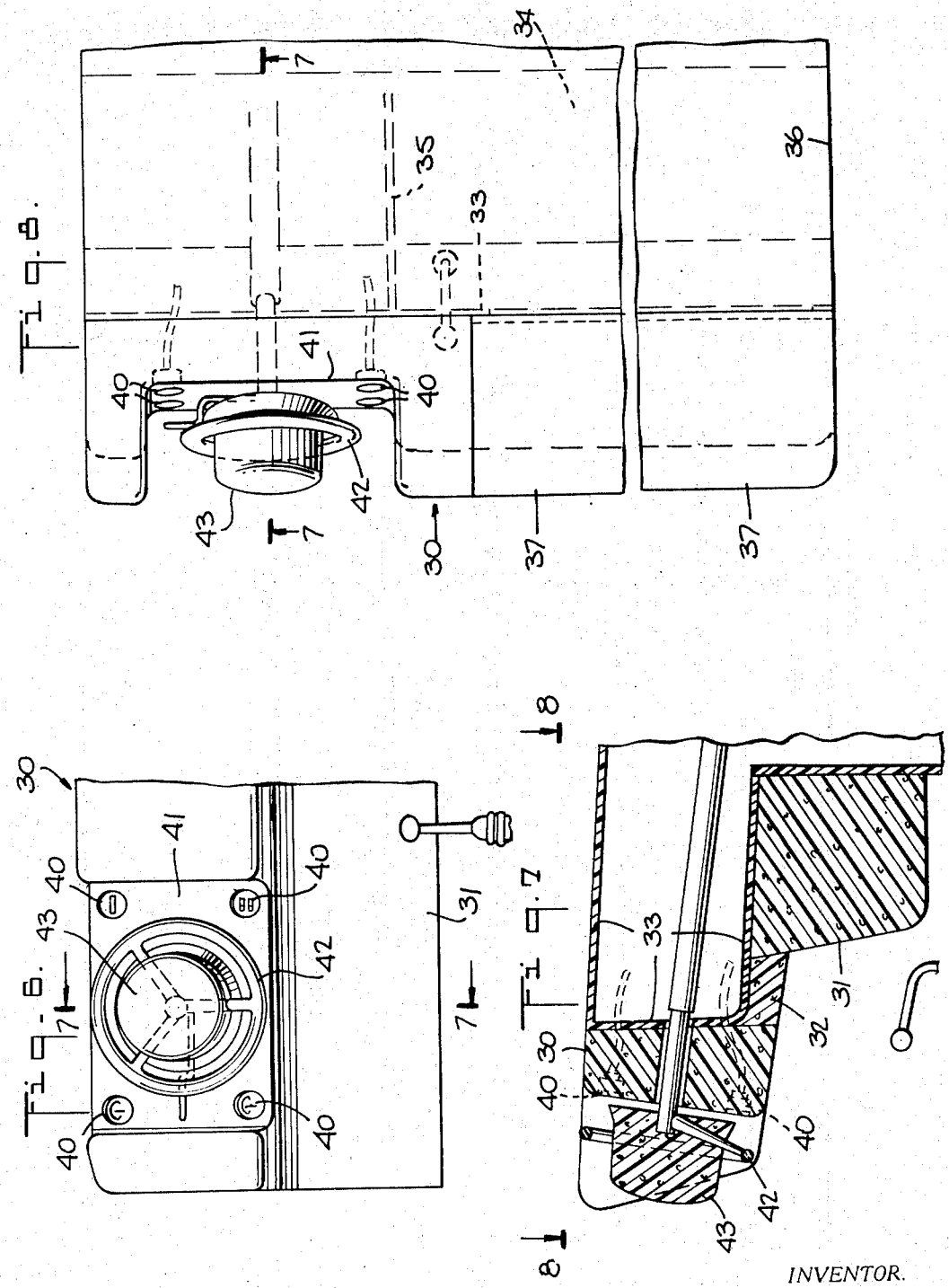

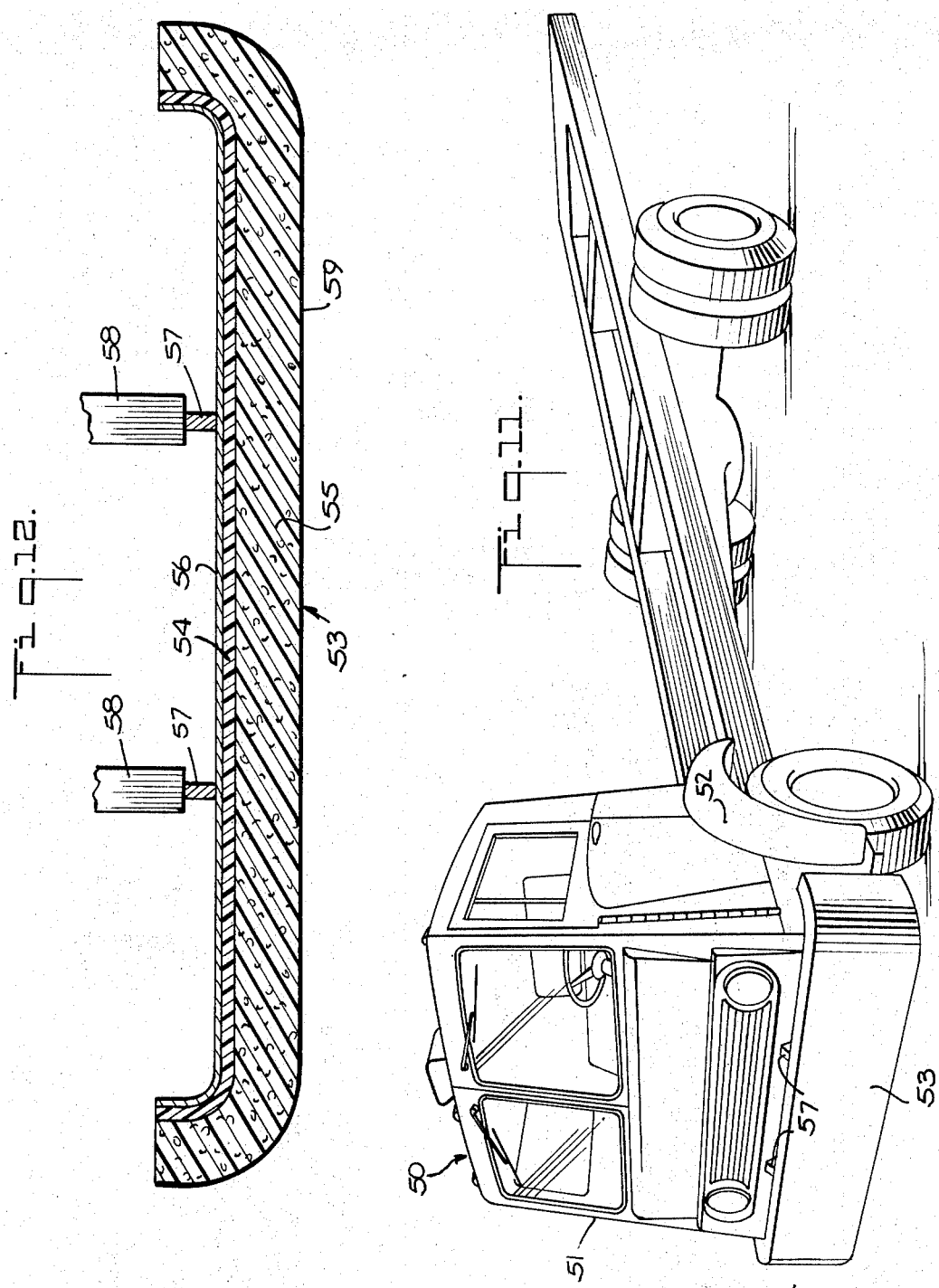

MOTOR VEHICLE INJURY AND DAMAGE PREVENTION SYSTEM

CROSS-REFERENCE TO RELATED APPLICATION

This application is a continuation-in-part of my prior copending application Ser. No. 35,720, filed May 8, 1970 now U.S. Pat. No. 3,702,711.

BACKGROUND OF THE INVENTION

1. Field of the Invention

The invention pertains to a system which greatly reduces or prevents altogether the injuries and property damage and consequent suffering, deaths and expense incident to motor vehicle collisions. The invention accomplishes this result by providing the motor vehicle with novel means which cooperate to absorb the energy of impacts in such a way as to minimize the harmful effects of collisions on the vehicle and its occupants and to minimize damage or injury to other vehicles, property, pedestrians, cyclists, animals, etc., struck by or in collisions with the vehicle constructed and equipped according to the invention. These results are achieved with minimum permanent distortion or other damage to the vehicle. Thus medical and repair bills and insurance costs are greatly reduced.

2. Background of the Invention

Conventional metal automobile bumpers and bodies are totally inadequate from the standpoints of damage and safety because, with them, even at such low parking lot speeds as 5 to 10 miles an hour the repair bills normally run to hundreds of dollars per collision while many deaths and injuries and more than 75 percent of property damage arise in accidents occurring at speeds not over 30 miles per hour. The severity of injuries and damage tends to increase geometrically with, i.e., with the square of, the speed of collision. The result is an astronomical burden of death, injury, suffering and property damage.

Prior art workers have endeavored in many ways to reduce the severity of the consequences of automobile accidents, but no truly effective solution deemed worthy of wide adoption, at reasonable costs, and not entailing serious disadvantages has heretofore been proposed.

During 1958, Cornell Aeronautical Laboratory, Inc. conducted tests (described in its unpublished Report No. YB-1004-D-5) for United States Rubber Company which indicated that for crash impacts up to approximately only 8 miles per hour the effectiveness of conventional metal automobile bumpers mounted on brackets extending away from the chassis could be enhanced by providing a metal back-up plate about 6 inches behind the bumper and filling the space between the bumper and the back-up plate with a lightweight energy-absorbing material known as No. 22266 "Ensolite" (trademark) manufactured by United States Rubber Company, together with supporting leaf springs. In the tests the car equipped with this narrow horizontal bumper was caused to collide with a vertical telephone pole. In this relatively infrequent type of accident, the shock-absorbing frontal area of the "Ensolite" was only about 360 square inches and in the collision only a fraction of this small area was brought vigorously into play. Consequently the Cornell tests had no impact whatever on the art and amounted to merely abandoned experiments.

Recently water bumpers have been used to a limited extent, particularly by taxi fleets. Such bumpers are described in Consumer Reports for Sept. 1969, pages 514–515. While they can reduce vehicle damage at speeds up to 10 miles per hour, at higher speeds the bumper itself is usually damaged and at speeds of the order of 20–30 miles per hour extensive damage to the vehicle itself and passenger injury occur. Moreover, unless the heights of the narrow bumpers involved match one another, the water bumpers have little or no effect even at low speeds such as are encountered in parking collisions. Also they increase the vehicle length by about 12 inches, increase the vehicle weight by about 100 pounds and have to be filled with water and antifreeze, which are sprayed into the air during collisions. Water bumpers do not begin to approach in effectiveness the safety system of the present invention which is highly effective in reducing injuries and damage at much higher speeds than those for which the water bumper is useful. The relative ineffectiveness of water bumpers is partly due to the fact that they are narrow and transmit the force of the collision to the chassis only, in line with conventional automobile bumper design. This is in contrast to the present invention in which the force of collisions is transmitted to the entire frontal or rear end area of the vehicle. For a water bumper to protect the entire front end of an automobile and provide sufficient stroke length for collisions at moderate driving speeds, it would have to weigh more than 500 pounds. Corresponding rear end protection would add at least 250 pounds to the weight of the vehicle.

Another recent development which has resulted in reports of rather good crash test results at speeds up to 25–30 miles per hour has involved the use of metal bumpers backed by metal shock absorbers filled with compressible silicone rubber, mounted on conventional metal automobiles. However this proposal undoubtedly requires extra weight, extra overall vehicle length, and high costs, fails to protect pedestrians, the fenders and bodies of other vehicles, or stationary objects hit by vehicles, fails to reduce the damage vulnerability of present metal bodies, fails to give adequately increased protection to vehicles or passengers in lateral collisions or roll-overs, and fails to distribute part of the collision forces directly to vehicle bodies and engines as well as to chassis, in contradistinction to the present invention.

Desirably, major automobile producer has recently indicated (Chemical Week for Nov. 5, 1969, page 21) that promising results are now being obtained with a rubberized bumper consisting of a porous rubber and for evidently employing a tripolymer based on neoprene having high restorability characteristics, wrapped around a heavy gauge metal frame. However this falls far short of the present invention and would not be forces generated during a head-on one-fourth Another type of narrow bumper of conventional dimensions which has been recently developed is one based on a core or body of cellular polyurethane coated with a protective non-cellular skin of polymeric material. However, because of the inherent limitations of the design of this type of bumper, it gives only very limited protection to the vehicle and almost no protection to its occupants.

Inflatable air bags which are located in the passenger compartment and inflated instantaneously upon collision are now the subject of much experimentation. However, these do not protect the vehicle from damage and moreover are themselves subject to certain serious disadvantages such as limited reliability and the possibility of injury to individuals of weights and sizes or sitting positions different from those for which specific air bags were designed. Nevertheless, if and when inflatable air bags are perfected, they could be used in conjunction with major features of the present invention as alternate or complementary interior protection for occupants.

Interior seat belts have long been used in vehicles to reduce injuries to occupants. They have the advantage of decelerating the occupant simultaneously with the deceleration of the crashing vehicle. However, conventional vehicle decelerations during collisions are often erratic, exerting severe shocks, and the narrow belts can exert injuriously severe restraints on parts of occupants' bodies during severe shocks. Moreover, occupants often fail to fasten their seat belts, rendering them useless.

Present interior crash pads of vehicles are generally made of relatively stiff material which can injure occupants. They are located too low relative to occupants' bodies to prevent them from hurtling against or through windshields. They are also too narrow to decelerate occupants without injury even in moderately severe collisions. Finally, they are located too far away from vehicle occupants, so that occupants may strike these pads at nearly full collision speeds after the vehicles have already been brought to complete stops.

BRIEF DESCRIPTION OF THE DRAWINGS

In the accompanying drawings:

FIG. 1 is a side elevation of a typical motor vehicle embodying a safety system of the present invention;

FIG. 2 is a plan view of the motor vehicle of FIG. 1;

FIG. 3 is a front elevation of the motor vehicle of FIGS. 1 and 2;

FIG. 4 is a detailed view, mainly in section, taken on the line 4—4 of FIG. 2;

FIG. 5 is a sectional view, taken on the line 5—5 of FIG. 1, of a preferred rigid laminated material (hereinafter "laminate") used in the body of the motor vehicle of the present invention and in the bumpers of the vehicle as well;

FIG. 6 is a view looking forward toward the steering wheel and crash pads on the driver's side of the vehicle of FIGS. 1 to 3;

FIG. 7 is a sectional view taken on the line 7—7 of FIG. 6;

FIG. 8 is a plan view, taken on the line 8—8 of FIG. 7, of the interior crash pads, instrument panel and steering wheel;

FIG. 11 is a perspective view of a standard commercially produced truck which was equipped with a front safety bumper constructed in accordance with the invention; and FIG. 12 is a horizontal cross-sectional view of the safety bumper shown in FIG. 11.

SUMMARY OF THE INVENTION

Figure 9:
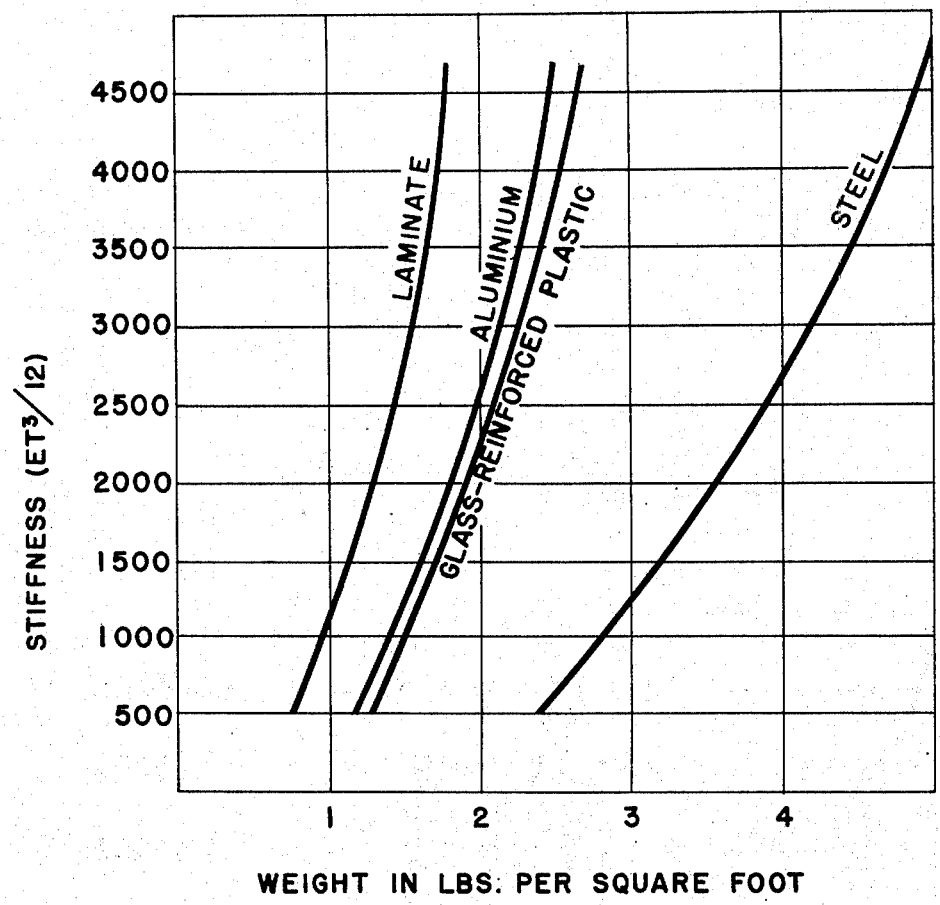
FIG. 9 is a graph which shows the stiffness of the preferred plastic laminate used in the invention, in comparison with other structual materials.

The safety system of this invention distributes forces of deceleration or acceleration during collisions and limits these forces to levels which the materials and components used in the vehicles of the invention can withstand. It also delivers to vehicle occupants G forces of deceleration or acceleration and pressures on the anatomy which are less than the limits of human tolerance. It obtains these results using bumper thicknesses much less than those which have been assumed to be required by physicists conversant with the problem, without causing inconvenience to vehicle occupants, and without requiring occupants to take any prior precautions such as fastening seat belts. This combined performance derives partly from the very short time intervals of deceleration or acceleration at the speeds, bumper thicknesses and crash pad thicknesses involved, making higher G levels tolerable. It also derives from the fact that the front interior crash pads are raised, make more extensive, made thick enough to allow adequate deceleration distances for vehicle occupants, and placed closer to vehicle occupants than are present conventional crash pads so that the occupants can be decelerated over distances greater than the stroke lengths of the interior crash pads alone. Thirdly, it derives from redesigned vehicles utilizing bodies made of impact-resistant, shock-absorbing material and having essentially flat front and rear ends extending completely across the vehicle in both the horizontal and the vertical directions. The headlights and taillights are recessed longitudinally and conventional grill work, bumpers, bumper braces, decorative elements, etc., commonly provided on the front and rear of motor vehicles are completely eliminated, being replaced by safety bumpers which are mounted directly on both the chassis and bodies and which incorporate compressible cellular materials having unusually large frontal areas and therefore able to exert total decelerating or accelerating forces which are unusually large for such compressible materials. Fourthly, it derives from use in the bumpers and the interior crash pads of shock-absorbing padding materials which exert greater compression resistance during early stages of each impact compression than do other types of flexible foam, exert greater average compression resistance during high speed impacts than during low speed impacts, and exert low rebound energy relative to impact energy. These attributes make it possible for such materials to decelerate or accelerate vehicles colliding at relatively high speeds over an unusually short distance with unusually moderate G forces, and to exert more moderate forces during lateral, back-to-front, and lower speed collisions, during collision impacts involving more than one mass of shock-absorbing material, and during bumper impacts with lightweight objects such as people and animals than are required for head-on vehicle collisions occurring at higher speeds. Fifthly, it derives from a special sandwich-type bumper construction which enables the system to operate effectively in collisions from various angles, in off-center collisions, and in collisions with narrow objects such as trees, telephone poles, and narrow metal bumpers. Additional advantages derived from the materials and novel constructions used are described herein. The result is a great reduction in frequency and severity of damage and injuries arising from motor vehicle collisions.

As used herein the term "collision" includes collisions with other vehicles and objects, pedestrians, cyclists, etc. In accordance with accepted principles of physics, the term "G" as used herein is the ratio F/W or $a/g$ where F equals the net force being exerted against any object, W is the weight of any such object, a is the acceleration or deceleration being experienced by any such object during a collision, and g is the acceleration due to gravity of a falling body in the absence of any air resistance.

DETAILED DESCRIPTION OF THE INVENTION

As used herein, the word "laminate" is used in a narrow sense to refer to a laminate of solid plastic cover layers which are bonded, preferably integrally, to an inner rigid cellular plastic core which typically and preferably is unicellular ABS (acrylonitrile-butadiene-styrene resinous material), this laminate having a stiffness in flexure $ET^3/12$ at least as great as that shown by the curve labelled "LAMINATE" in FIG. 9 of the accompanying drawings, which shows the stiffness of the laminate at various weights per square foot in comparison with the stiffnesses of other materials commonly used for vehicle bodies. (E is the flexural modulus and T is the total thickness of the laminate.) The laminate has an impact resistance such that it is capable of withstanding without breaking the impact of a 2 lb. steel ball dropped on it from heights up to 9 feet at temperatures ranging from minus 40°F. to 175°F. The $ET^3/12$ relationship is a measurement of rigidity and is a measured unit. This kind of laminate is described in detail on pages 344–352 of "Rigid Plastics Foams," Second Edition, 1967 published by Reinhold, by T. H. Serrigno. It is also described in a recent brochure entitled "Royalex ABS: properties and uses" published by Uniroyal, Inc. and in an earlier brochure entitled "The Indestructible Cord" published by United States Rubber Company. Methods of manufacturing such a laminate are detailed in U.S. Pat. Nos. 3,041,220; 3,070,817; 3,206,354; 3,356,560; 3,386,878; and 3,463,687. Without intending to be limiting, it may be stated that the thickness of such laminates typically ranges from 0.25 up to 0.75 inch or even up to 1.25 inches where needed, the density typically ranges from 20 to 35 pounds per cubic foot, the tensile strength is at least 1500 psi, the heat distortion temperature at 250 psi is at least 180°F., the compressive strength is at least 200 psi, the stiffness referred to above increases by less than 10 percent as the temperature is reduced from room temperature to 0°F. and decreases by less than 50 percent when the temperature is raised from room temperature to 180°F. and that the core of the laminate usually constitutes most, say 70 percent to 80 percent, of the total thickness of the laminate. As described later, such laminates also have other properties advantageous in reducing injury and damage.

As used in this description, the term "padding" means a cellular shock-absorbing plastic material having the following physical properties:

| | |
|---|---|
| Density | Not over 35 lbs per cu. ft. |
| 25% Compression Resistance, proximately 25 miles per hour, for 12-inch padding thickness) | At least 10 and preferably sq. in.* |
| Tensile Strength | At least 15 lbs. per sq. in.* |
| Maximum Water Absorption (Cut Surface) | Not over 1 lb. per sq. ft. |
| Rebound Energy Delivered | Not more than 35% of impact energy |

* (preferably at least 50 lbs. per sq. in. for the padding used in the bumpers).

At the present time, the preferred forms of such material for use in the invention are the shock-absorbing types of unicellular (closed cell) plastic foam sold under the trademark "Ensolite" by Uniroyal, Inc. and described in the Uniroyal brochures "Ensolite Safety Material" (1967) and "Ensolite" (1969). These "Ensolite" materials are chemically blown or foamed blends of thermoplastic resin such as polyvinyl chloride alone or with a small amount of ABS, butadiene-acrylonitrile rubber (NBR) and one or more compatible plasticizers in proportions of from 10 percent to 70 percent (preferably 45 percent to 60 percent of said resin, from 16 percent to 80 percent (preferably 30 percent to 45 percent) of said rubber, and from 6 percent to 60 percent (preferably 6 percent to 12 percent) of said plasticizer(s), said percentages being by weight based on the sum of said constituents and totalling 100 percent, and are made in the manner taught in U.S. Pat. Nos. 2,570,182 and 2,757,147. Particularly preferred are "Ensolite" types AA, AH, AL and LDAF. The physical properties of types AA, AH and AL are shown in the brochures just cited while those of type LDAF are shown in Uniroyal Technical Data Bulletin entitled "Ensolite and Kem-Blo" dated Mar. 1969. However, the invention is not limited to the use of "Ensolite" foam but can be practiced with equivalent compressible, cellular foamed plastic materials such as those based primarily on polyurethanes, vinyl polymers, polyethylene, polypropylene, or polystyrene, such rubbers as neoprene, Buna N, SBR, and blends of such polymers with one another or with other compatible polymers such as for example ABS, etc.

Referring now to the accompanying drawings, FIGS. 1 through 8 portray an automobile incorporating a typical safety system of the present invention comprising the following three principal elements which are detailed below:

1. Laminate-padding bumpers both front and rear.
2. Laminate body including fenders, and
3. Specially designed interior crash pads.

1. The Bumpers

The automobile body 1 has flattened front and rear ends upon which are mounted front and rear bumpers 2 and 3. Fixed vertical sheets 4 and 5 of laminate (double sheets can be used if desired) are fastened in any suitable way across the front and back contiguous with both the body 1 and the chassis 6 so that they are braced by the body and chassis and so that impact forces reaching sheets 4 and 5 are transferred directly and simultaneously to the body and chassis. Typically the body is made from the laminate and the chassis is made of metal. The front and rear metal channel cross members 7 of the chassis 6 can be extended laterally substantially entirely across the width of the vehicle so as to brace the extremities of the bumpers and to help restrain the front and rear wheel assemblies during severe collisions. In such case, a smooth, strong covering element 8, which can be made of metal, is provided across the ends of channel members 7 to prevent injury to tires and wheels when they are pressed against extended channel members 7 during severe collisions. These chassis cross members 7 can also be widened vertically if necessary to prevent excessively concentrated pressures on laminate sheets 4 and 5 during severe collisions. Alternatively, the laminate sheets 4 and 5 can be reinforced by flat sheets of steel or other metal extending over most or all of their inside transverse areas for the purpose of distributing the concentrated outward forces exerted by the chassis and the braces restraining heavy internal components during collisions.

Laminate sheets 4 and 5 extend across the entire width and the entire front and rear heights of the vehicle except for the corner areas where the headlights and the taillights are located. Typically these sheets measure at least two feet up and down.

The design of the vehicle is such that both the front and the rear wheel assemblies 9 are moved further back than in many conventional vehicles. The front wheel assembly is moved back in order to allow the front bumper 2 to extend completely across the front of the vehicle and to restrain and protect the front wheel assembly during deceleration in a severe front-end collision. The rear wheel assembly can be moved back to avoid an excessively short wheel base and also to locate this assembly sufficiently close to the rear bumper 3 so that the rear wheel assembly is restrained and protected during acceleration due to a severe rear-end collision.

A relatively thick (compared to the laminate sheet 4) layer 11 (typically 8 inches thick) of padding is cemented or otherwise securely mounted in front of laminate 4 in the front bumper 2. A corresponding relatively thick layer 12 (typically 4 inches thick) of padding is likewise secured on the face of laminate sheet 5 in the rear bumper 3. These padding masses 11 and 12 are typically made by plying-up relatively thin sheets of padding as by cementing; the reason for this is that most of these padding materials are now commercially available at reasonable cost only in thicknesses not greater than 1 or 2 inches.

Padding layers 11 and 12 have substantially the same area profiles as laminate sheets 4 and 5. As shown, they are tapered slightly for better road visibility and appearance and for better headlight and taillight clearance.

A floating, vertical sheet of laminate (or two sheets thereof if desired) 13 is sandwiched, as by cementing, between the inner padding mass 11 and an outer padding mass 14 on the front bumper 2. Likewise a floating vertical sheet of laminate 15 is sandwiched between inner padding mass 12 and an outer padding mass 16 on the rear bumper 3. These floating laminate sheets 13 and 15 are made slightly narrower, say 1 inch less at each side, than the width of the padding masses between which they are sandwiched, the resulting slots being filled with rims of padding to reduce the force of impact against the floating sheets in lateral collisions; this treatment also helps to prevent snagging of the floating sheets 13 and 15 against other vehicles during parking and reduces wear on the straps described later. It is preferable to cement such rims of padding only to the edges of the floating laminate sheets and to the outer layers of padding but not to the inner layers of padding; the reason for this is to avoid unnecessary stretching, tearing or delamination during off-center collisions or collisions with narrow objects, which could force momentary separation at the outer extremities.

The front layer 14 of padding is mounted, as by cementing, on the outer face of the floating laminate sheet 13. This layer 14 typically is 4 inches thick. Likewise the outer layer 16 of padding, typically 2 inches thick, is secured on the outer face of laminate sheet 15 in the rear bumper. These outer layers of padding 14 and 16 have approximately the same measurements across the vehicle and vertically as the padding masses 11 and 12, respectively, but are preferably tapered slightly and rounded off for better road visibility and appearance and clearance for headlights and taillights.

All of the padding material in the bumpers is preferably coated on its outside with polyvinyl chloride or other suitable material for better appearance, weather protection, abrasion resistance, durability and slipperiness. Any such coating can be pigmented to match the color of the vehicle body 1.

The floating laminate sheet should be located as far out from the fixed sheet as is possible without causing the floating sheet to be broken by typically narrow objects encountered in collisions, such as conventional metal bumpers and telephone poles, at the maximum collision speed which the vehicle is designed to handle without damage or injury to occupants, in order to spread out the forces of impact to as thick an inner layer of padding as possible. Often the floating laminate sheet is so located that the outer padding layer is one-fourth to three-fourths as thick as the inner padding layer.

Two laterally spaced inextensible connecting elements 17 are shown as being provided in the right-hand and left-hand portions of the front bumper 2. If desired, similarly located inextensible elements (not shown) can be provided in the rear bumper 3. These elements can conveniently take the form of metal chains, as shown in the drawings, or equivalent means such as inextensible straps, ropes or cables. Elements 17 are shown as being fixedly attached to the lower portion of the floating laminate sheet 13 and as fixedly but adjustably attached to the upper portion of the inner laminate sheet 4. Inextensible elements 17 prevent sagging, with the passage of time, of the inner padding mass 11. The effective lengths of elements 17 can be adjusted in any suitable manner; for example, with the chains shown in the drawings this adjustment can be made by means of padlocks 18 in the obvious manner. Such padlocks or other attachments at the upper ends of elements 17, or the upper ends of elements 17 themselves, preferably are made weaker than the rest of elements 17 and their connections with floating sheets 13 and 15, in order to avoid any breakage in hard-to-reach interior parts of the bumper.

It is preferred to provide each of the bumpers with inextensible means for preventing significant longitudinal movement of the outer extremities of the floating laminate sheets 13 and 15 away from the fixed laminate sheets 4 and 5, respectively, during off-center collisions or collisions with narrow objects, but permitting the floating laminate sheets to move freely toward the fixed laminate sheets during collisions. One way of achieving this which is portrayed in the drawings involves the provision of non-stretchable straps 20 wrapped around the exposed portions of both front and rear bumpers both horizontally and vertically. As shown, the front bumper is provided with four such strips wrapped around it front to back vertically and two such straps wrapped around it front to back horizontally, thus crossing the four vertical straps. The rear bumper is provided with two such straps wrapped vertically and two wrapped horizontally. As will be obvious, these straps can be equipped with any suitable means, such as metal buckles, or stops, to adjust their lengths. Any suitable means can be provided to prevent loss or dislocation of the straps during collisions. The outside surfaces of the straps should be made slippery in any suitable way as by coating, in order to promote sliding during off-center collisions. These straps can match the vehicle in color or can be in contrasting "racing stripe" colors for greater visibility and safety. In any case the straps should be white or bright colored in front of the headlights and in back of the taillights for lateral visibility at night.

An alternative to the encircling straps shown in the drawings would consist of inextensible straps, ropes, cables or chains attached longitudinally between the two laminate sheets in each bumper at positions near their extremities, so that the edges of the movable laminate sheet would be restrained from moving away from the fixed laminate sheet during off-center or narrow-object collisions.

Still another alternative would be to enclose part or all of the exposed portions of each bumper in a jacket or sleeve of flexible inextensible sheet material, such as square woven fabric having a suitable plastic coating for appearance, durability, slipperiness and weather protection, secured in any suitable manner to the fixed laminate sheet.

The mechanical purposes of the encircling straps shown in the drawings and the alternatives thereto which have just been described are (1) to help prevent bumper sagging, (2) to help hold the bumper together in case of rear quarter collisions against the front bumper alone, such as often occur during parking, (3) to spread further the initial impacts of narrow objects, such as metal bumpers and trees, by converting part of such impacts into compressions of the outer surfaces and edges of the safety bumpers, and (4) to keep the outer ends, tops and bottoms of the floating laminate sheets and the layers of padding from rocking or bending excessively during off-center collisions or collisions with narrow objects such as trees or bumpers. This fourth function helps prevent ply separation, reinforces the floating laminate sheet and the layers of padding during narrow-object collisions, and increases the effective shock-absorbing area of the mass of padding sandwiched between the floating and the fixed laminate sheets during off-center and narrow-object collisions.

To assist in deceleration or acceleration of the engine or other heavy internal components of the vehicle such as the differential assembly, laterally spaced fixed metal braces, extending generally longitudinally, are provided where desired between the fixed laminate sheets of the bumpers and such heavy internal components of the vehicle. These are exemplified by metal braces 21 fastened in any suitable manner with broad metal bases to the fixed vertical laminate sheet 4 of the front bumper 2 and extending directly to the engine 22. In addition, the conventional moorings of engines and other heavy components preferably are reinforced in any suitable way to further reduce the possibility or extent of damage.

Certain optional features which can be used to improve the efficiency, utility, or marketability of the bumpers include:

1. License plates made from soft, flexible EPDM rubber which avoids damage and injuries and resists fading and cracking on prolonged exposure to weather,
2. White paint, coating or other light coloration on the vertical upper sides of the bumpers and on the straps located in front of the headlights or in back of the tail-lights to make them visible from the sides at night,
3. Decks of cheap, disposable, plastic film slip covers extending across the front and around the sides of at least the lower portions (below headlights and taillights) of the bumpers, the purpose of these being to slip off one at a time to promote sliding and reduce the possibility of tearing up the padding during off-center collisions.

During most collisions, the up and down width, typically about two feet, and the lengths (typically equal to the width of the vehicle) of the front and rear bumpers insure that at least one safety bumper will intervene between each vehicle and the object causing the impact. The over-under "jumping" of conventional narrow metal bumpers of different heights is avoided. An unusually large safety bumper area, typically more than 1,000 and often more than 1,400 square inches, is available at each end of the vehicle to resist impacts with approximately flat surfaces, enabling the padding to resist large total impact forces with only relatively moderate compression resistance in terms of pounds per square inch of frontal area. The outer layer of padding, because of its large frontal area, its compression resistance, and its tensile strength, reduces the force of impact with both wide and narrow objects by offering resistance while being compressed through up to 75 percent or more of its initial thickness. Thus it reduces damage to these colliding objects. It also cushions the impact of living people (pedestrians or cyclists) and animals striking the front or back of the vehicle, saving them in many cases from death or injury. As a crash progresses, this outer layer of padding prolongs and reduces the force of impact acting against the floating rigid vertical sheet of laminate 13 or 15, pushing this sheet inward with a controlled build-up of force and reducing the possibility of damage to the colliding object, and, if the colliding object is another car, to its occupants. In addition, the outer layer of padding on the bumpers offers increasingly higher compression resistance per square inch to narrow objects such as trees and metal bumpers and also increasingly spreads out the area of their force of impact against the floating sheets of laminate as the collision progresses. These effects arise from the tensile strength of the padding and the related diagonal compression resistance of the padding compressed beneath the padding which is stretched around the narrow area of impact. All three effects help keep the floating laminate sheet from being broken by violet collisions with narrow objects.

The floating laminate sheets 13 or 15, in turn, may bend or compress slightly as the crash progresses, further reducing the forces of impact. However, the laminate has great resistance to sharp bending and to impacts, and it is reinforced and stabilized by restraining forces exerted by the inextensible restraining means typified by straps 20 or alternatives thereto such as are described above. Thus the floating laminate sheet remains relatively flat during collisions with narrow objects, and rocks only slightly or not at all during off-center collisions. As a result, it spreads the force of impact over substantially the entire area of the thick inner layer of paddings 11 or 12, enabling this inner padding layer to resist large impact forces from both wide and narrow objects and from both on-center and off-center collisions. This inner layer of padding, which can also compress by 75 percent or more, further prolongs and reduces the remaining force of impact of the collision, further spreads the force out, and transfers it as a spread-out, reduced force of longer duration to the fixed laminate sheet 4 or 5 disposed across the front or rear of the vehicle body and chassis. This fixed laminate sheet, in turn, flexes and compresses slightly under heavy pressures, further moderating the impact force and transferring the moderated impact force directly and simultaneously to the body and chassis of the vehicle, and by means of metal braces, such as those indicated by reference numeral 21, directly and simultaneously to the engine or other heavy internal components of the vehicle protected by such braces. Thus the chassis, body, and heavy internal components are all decelerated directly by the bumper, greatly reducing stresses on the chassis and on the connections between the various parts of the vehicle, helping to stabilize the bumpers, and distributing more broadly the outward forces exerted against the fixed transverse laminate sheets 4 and 5 during collisions. All these further reductions of the forces of impact also further reduce damage to colliding objects.

A final prolongation and moderation of heavy impact forces is achieved in the preferred embodiment of the invention wherein the body 1 of the vehicle is formed from laminate. With this construction, parts of the impact forces are transmitted from the fixed vertical laminate sheets 4 and 5 of the bumpers 2 and 3 to the body 1 of the vehicle which compresses longitudinally.

In case of a collision so violent as to overwhelm all of the foregoing moderating barriers, the padding material, the movable and the fixed vertical laminate sheets, and the laminate vehicle body can bend, compress, dent, and crush beyond their recovery limits, further prolonging and moderating the impact, without shattering, splintering, or collapsing.

Both the materials of the padding and the laminate tend to recover their shapes relatively slowly after deformations which do not exceed the recovery limits of these materials. This adds the advantage of minimizing vehicle bouncing during collisions.

In case of off-center collisions, the padding (bringing into play its tensile strength and related diagonal compressions resistance at the inside edge of the area of impact) and the floating laminate sheet (which is pressed toward the vehicle on one side harder than on the other) both tend to tilt toward the side of the collision. This tends to convert head-on collisions into sliding collisions which fend colliding vehicles away from each other and reduce the forces of impact, as when a ski-jumper lands safely from a great height onto the inclined plane of a ski jump, whereas a similar landing on a horizontal surface would kill him. To accentuate this effect, the exposed surfaces of the bumper should be as slippery as possible. The desired slipperiness can be achieved by the use of very slippery coatings for the exposed surfaces of the padding and for any other exposed parts of the bumper such as the encircling straps 20, and/or by the use of the plastic flim slip covers described above.

An additional function of the floating rigid sheet of laminate is to help prevent the padding from sagging after long periods of use. The individual layers of padding are attached to one another, as by cementing, and the resulting shock absorbing masses of padding are also attached, as by cementing, to both sides of the floating sheet of laminate which in the case of the front bumper is shown as in turn supported by the diagonally hung anti-sag elements 17.

Within the range of normal motor vehicle weights, dimensions, and operating speeds, and within the range of compression resistances of presently available flexible padding materials, it is desirable to maximize the transverse areas of the bumpers of the invention to the full extent possible without impairing necessary road visibility, headlight and taillight clearance, engine radiator air intake, etc. Calculations based on a series of laboratory impact test results confirm that when the transverse area of such a bumper of given thickness is reduced, reducing the total compression resistance force exerted by the bumper during the early stages of its compression, the total impact energy which the bumper can absorb within normal tolerable limits of peak G forces of deceleration is reduced, impairing bumper performance. Stated conversely, to absorb the same amount of impact energy, the total peak G forces of deceleration exerted by the bumper padding in the ultimate stages of its compression are undesirably increased, despite the reduced bumper area, as a result of the bumper's being compressed further. This more severe compression of the bumper also increases the likelihood of damage in severe collisions to the bumper padding, reducing its effectiveness in subsequent accidents.

By contrast, maximizing the transverse areas of bumper padding 1. increases the capacity of the safety bumper of given thickness to absorb impact energy within necessary limits of peak deceleration forces, thus increasing tolerable collision speeds,
2. minimizes bumper thickness necessary to absorb impact energy at intended maximum collision speeds within necessary limits of peak deceleration forces,
3. reduces the severity of crushing of the bumper padding, thus helping to preserve the bumper's effectiveness in further collisions,
4. reduces any importance of side-bulging of the padding, thus contributing to the bumper's effectiveness,
5. reduces or eliminates the present problem of different bumper heights on different vehicles,
6. gives better protection to cyclists, pedestrians, and animals struck by or striking against vehicles, by offering larger contact areas for their bodies and by reducing the chances of their being struck by harder or more angular parts of the vehicle,
7. gives greater protection against damage to the bodies of other automobiles, particularly in front-to-side collisions, and
8. gives greater protection to the vehicle's own body.

The principles set forth in the two preceding paragraphs make it manifest that with typical vehicles and operating conditions any reduction in transverse area of the safety bumper of the invention without undesirably increasing its longitudinal thickness impairs its effectiveness, contrary to the approaches taken by prior workers in the art who have often attempted to minimize the transverse areas of safety bumpers and particularly their heights, in unconscious imitation of conventional metal bumpers or in the mistaken belief that effectiveness of safety bumpers is necessarily increased when the energy absorption per unit of transverse area is increased by the more severe compression incurred by the smaller transverse area of shock-absorbing material.

Based on the foregoing principle of providing maximum possible transverse area for vehicle bumper padding, it is possible to calculate the longitudinal thickness of a given type or combination of types of bumper padding material necessary to decelerate a vehicle of given weight, with given maximum transverse area available for front bumper padding, from a given intended head-on collision impact speed, with a given limit (Gp) of peak G's of deceleration. The following general formula has been derived for this purpose:

$$T = WV_1^2/2gAe$$

where $T$ = longitudinal bumper padding thickness in inches.

$W$ = weight of vehicle in pounds.

$V_1$ = intended maximum collision impact speed in feet per second.

$g$ = acceleration due to gravity (equals 32.2) in feet per second.

$A$ = transverse area of bumper padding in square inches.

Figure 10:
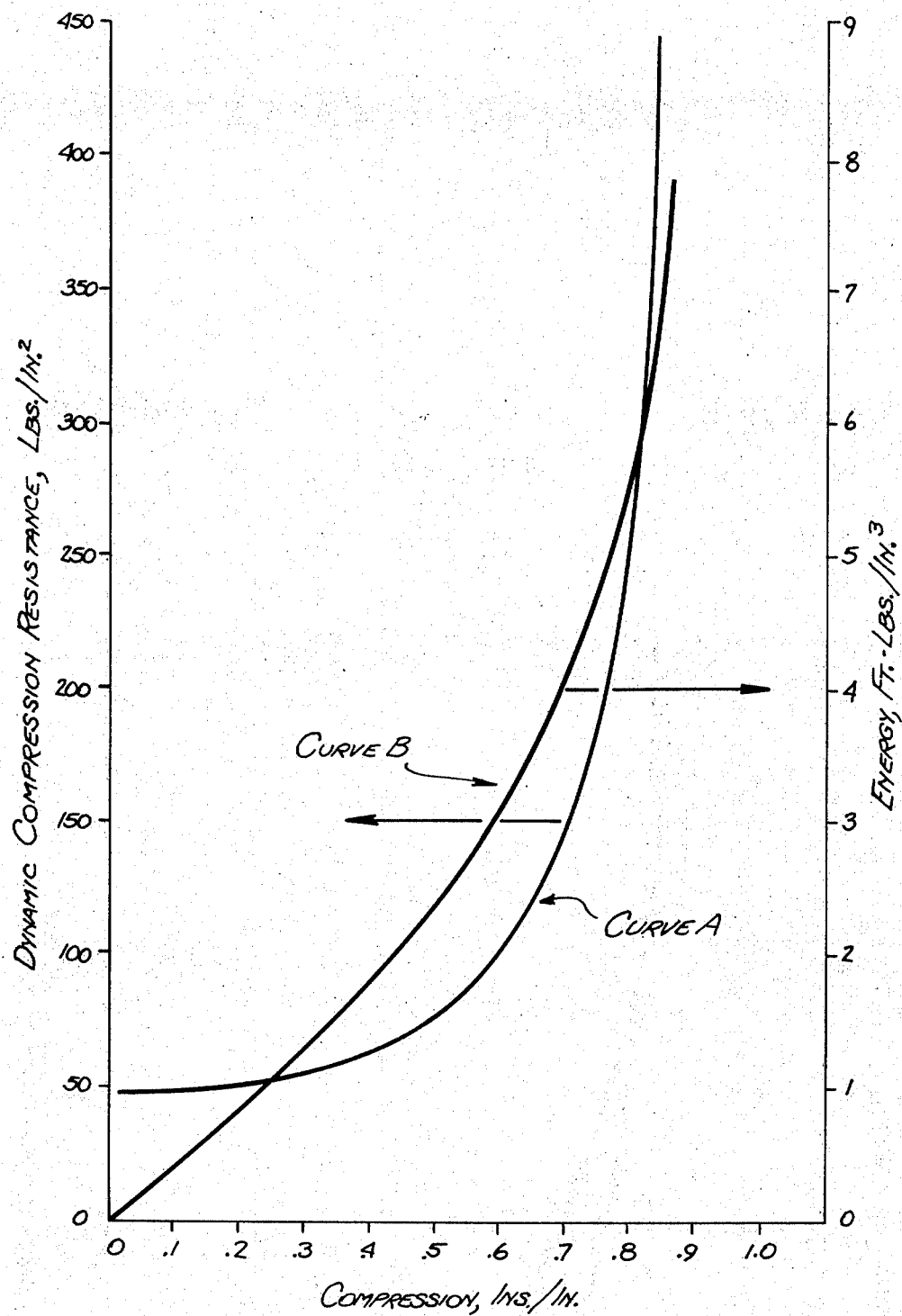
FIG. 10 is a graphical portrayal of compression resistance and energy absorption plotted against degree of compression of a bumper padding material, representing head-on impacts at varying speeds against a flat barrier, for use in estimating approximate longitudinal bumper padding thicknesses to be used in practicing the invention.

$e$ = energy (expressed in foot pounds per inch$^3$) absorbed by each cubic inch of padding material when compresssed to the point where its compression resistance in pounds per square inch of transverse area equals $GpW/A$ Values for the foregoing factor can be readily obtained from a graph such as that illustrated in FIG. 10 which is based on laboratory impact testing of preferred bumper padding material, namely "Ensolite" type LDAF. In FIG. 10 plotted Curve A shows dynamic compression resistance of that material at various degrees of compression. At maximum intended collision speeds within ranges of say 15 to 35 miles per hour and with corresponding bumper thickness varying from say 4 to 18 inches, the effects of "rate sensitivity" (change of compression resistance caused by changes in rate of compression) are relatively small and may be disregarded.

Curve B shows energy absorption in foot pounds per inch cubed of padding material, also at various degrees of compression during impacts. The energy absorbed was calculated from the area under Curve A at each respective degree of compression.

Using the above formula and the type of graph illustrated in FIG. 10, the steps of estimating necessary front bumper padding thickness are as follows:

a. Decide on maximum allowable peak G forces of deceleration (e.g., Gp = 80).

b. Determine maximum feasible transverse area of front bumper padding which can be made available (e.g., 1,375 in.$^2$).

c. Calculate weight of vehicle per square inch of transverse front bumper padding area W/A (e.g., 2,750 lbs. weight per 1,375 in.$^2$ of padding area = 2 lbs. per in.$^2$).

d. Calculate allowable peak compression resistance using (a) and (c) (e.g., 80×2 = 160 lbs./in.$^2$).

e. Use impact energy graph (e.g., FIG. 10) to determine the energy absorption per cubic inch of padding (e) obtainable without exceeding the peak compression resistance calculated in (d) above (e.g. 160 lbs./in.$^2$ compression resistance occurs at 72 percent compression resistance of "Ensolite" LDAF after energy absorption of 4.3 lbs./in.$^3$ = $e$).

f. Use the foregoing formula to calculate bumper thickness in inches (T). $T = WV_1^2/2g\,Ae$ (e.g., for a collision at 20 mph:

$T = 2 \times (20 \times 1.47)^2/2 \times 32.2 \times 4.3 = 6.25$ inches thick).

The transverse area of each bumper of the present invention is preferably equal to at least 40 percent of the end area of the vehicle adjacent to the bumper, excluding areas devoted to windshields, windows, clearance for lights, air intakes, etc. For many types of vehicles the transverse area of the bumper preferably equals 100 percent or more of the adjacent end area of the vehicle with the foregoing exclusions. In some cases the bumper can extend beyond the lateral and/or bottom edges of the adjacent end area to give added protection and to make proper contact with smaller vehicles, as in the embodiment shown in FIGS. 11 and 12 and described in the Example below.

Frequently, as in the case of ideally constructed passenger cars, the transverse area of each bumper is equal to at least 50 percent of the maximum projected cross-sectional area of the vehicle including windshield and roof. However, the many possible types, sizes and styles of cars, trucks and buses and the many possible combinations of requirements for windshields, clearance for lights, air intakes, etc., as well as the advisability of a slanting hood and somewhat higher seats than are normally provided in conventional passenger cars (as detailed below), often make it more useful to define the transverse bumper area in proportion to the available end area of the vehicle as set forth above.

With bumper areas substantially less than 40 percent of the adjacent end area of the vehicle, the thickness of the bumper needed to absorb the impact energy of collisions occurring at driving speeds above 15–20 miles per hour, without exceeding acceptable limits of peak G's of deceleration and without crushing the padding excessively, usually has to be undesirably increased in order to achieve a bumper compression stroke length sufficient to offset the reduced compression-resisting area, and this either undesirably increases the overall length of the vehicle or undesirably reduces the usable space inside the vehicle or both.

The total thickness of the padding layer or layers in the front bumper is typically and preferably at least 4 inches since this thickness would provide a stroke length of approximately 3 inches, requiring no more than 40 G's of average stopping force during the deceleration of a vehicle colliding at approximately 17 miles per hour. Lesser thicknesses tend to generate G's which would generally damage vehicles and seriously injure people. Greater thicknesses, up to about 18 inches for typical passenger cars, can be used to give equivalent protection at higher collision speeds or with very heavy vehicles or to reduce G's at lower collision speeds, but for typical passenger cars thicknesses greater than 18 inches would be inconvenient and generally unnecessary.

Similar considerations dictate the total thickness of the padding layers in the rear bumper except that this thickness should be approximately half that of the front bumper on a given vehicle, typically and preferably from 2 to 9 inches, to give approximately the same protection. The rear bumpers have only about half the thickness of the front bumpers for the following reasons:

a. A front-to-back collision against a stationary vehicle requires only about one-half of the energy absorption by safety bumpers required in a head-on collision or in a crash against a fixed solid object at the same speed. A vehicle equipped with a half-thickness rear safety bumper of the invention can be struck from behind by a vehicle with no safety bumper at nearly the same damage-free or injury-free speed as would be tolerable for two vehicles equipped with full-thickness front safety bumpers colliding head-on.
   b. Vehicles backing up generally do not proceed as fast as vehicles moving forward.
   c. When most motor vehicles are made in accordance with the invention, back safety bumpers of the invention struck by front safety bumpers of the invention will provide combined shock-absorbing capability three times that provided when a half-thickness back safety bumper is struck by a vehicle with no safety bumper. The total longitudinal space needed for the front and rear safety bumpers of the invention, typically from 7 to 29 inches, is offset by elimination of conventional bumpers, bumper guards, bumper braces, grill work, and other end structures of the vehicle, so that the overall lengths of the vehicles of the invention are unchanged, and internal space loss is small or nil. Also additional interior space is gained by building the car body with the up-sloping hood described below and by positioning interior crash pads nearer to the front seat occupants, also as described below.

2. The Body

As indicated in the drawings, the body 1 is constructed with flattened front and rear ends provided with the novel bumpers described above. The body, including the fenders, is constructed from the laminate a form of which is portrayed in FIG. 5. The innermost laminate sheets 4 and 5 of the front and rear bumpers actually constitute the front and rear ends of the body, being fixedly, and typically integrally, attached to the rest of the body in any suitable manner. If desired, the body 1 can be reinforced with steel members, such as roll bars, in certain areas for additional strength and to prevent buckling.

As indicated in FIG. 5, the laminate typically comprises a cellular core 23 on each side of which are solid substrate layers 24 and outer surface skin plies 25, all of these laminate being integrally bonded to one another in manufacture.

The laminate body and fenders can be easily formed, as by vacuum-forming, from the commercially available sheet laminate, using well-known techniques of forming and of joining the various parts into an integral structure. Making the body and fenders from the laminate serves the following purposes:

a. Reduce vehicle weight greatly, reducing forces of collision impacts, as well as reducing vehicle production costs and gasoline consumption.
   b. Absorb a substantial part of collision impact forces directly into the body from the fixed vertical laminate sheets 4 and 5, helping to stabilize the bumper during collisions, simplifying bumper construction, and reducing stress on the chassis and on the connections between the chassis and the body. A metal body of reasonable weight could not perform these functions to a comparable degree without crumpling or bending permanently.
   c. Make bodies and fenders virtually undentable. Dents which do occur can be easily and cheaply repaired with heat guns, soap and water, and in extreme cases, with exposy resin patches.
   d. Upon extreme impact during lateral collisions or capsizing accidents, bodies and fenders made from the laminate bend, compress, dent and ultimately crush without shattering, smashing, or collapsing. Thus they reduce the forces of impact to the vehicle from and to the connections between frame, body, engine, etc., give the occupants better protection against collision shock and against vehicle body collapse, reduce bouncing, and produce no flying fragments, sharp edges, or splinters.
   e. In the most extreme head-on collisions, the laminate body can compress, dent, and ultimately crush longitudinally, further reducing impact forces and protecting occupants.

The seats of the safety vehicle are preferably made slightly higher than in most present vehicles, so that the occupants' knees are normally less straightened, their shins are less close to horizontal, and their feet are less close to the front end of the cabin space than in conventional vehicles. This reduces any tendency for leg leverage to throw occupants upwardly during head-on collisions.

A special feature of the invention resides in providing an upwardly and rearwardly slanting hood 26 which slopes upwardly from the top of the fixed laminate sheet 4 to the windshield 27 at such an angle that its line of slope if extended would reach to a level approximating that of the lower facial areas of average-sized adult front seat occupants. This feature makes space which is now wasted available in the passenger compartment for accommodating the specially designed and arranged interior crash pads described below.

3. The Interior Crash Pads

The interior crash pads consist primarily of top and bottom masses of padding 30 and 31 extending completely across the front portion of the passenger compartment. The longitudinal thickness of these crash pads preferably is approximately 12 inches to ensure delivery of tolerable G forces to vehicle occupants. To estimate necessary front crash pad thickness for given types of padding, for given intended maximum head-on collision speeds, and for given allowable peak G forces to be incurred by vehicle occupants, a procedure analogous to that described above to calculate necessary bumper padding thicknesses can be used, except that the weight per unit area of impact (W/A) will be determined by weights and contours of human anatomies, and the energy absorption graphs for determining the factor ($e$) will preferably be based on laboratory testing of penetrating impacts.

The pad 30 is located generally below and rearwardly of the windshield 27 with the upper surface of the pad at least as high as the rearmost portion of the sloping front hood and preferably with the upper surface of the pad in line with the slope of the front hood so that the upper rear rounded edge of the pad is roughly at the level of the lower facial portions of average-sized front seat occupants and its bottom portion at lower-chest or upper-stomach level. Pad 30 is thus located higher than the knees, in contrast to most present vehicles, and is also located further back and nearer to the front seat occupants than is the case now with conventional crash pads in conventional vehicles. This arrangement does not reduce the range of vision of occupants or interfere unduly with their freedom of action.

Pad 31 is located below and forward of pad 30. The two pads are so shaped and placed that during a crash the average occupant's face, chest, shoulders, abdomen, knees and shins all plunge forward into the two crash pads simultaneously. Thus the occupants are not thrown upwardly by knee leverage or hurled forward against or through the windshield. Instead, they are restrained and decelerated by relatively moderate pressures exerted simultaneously over most of the fronts of their bodies instead of the much higher pressures generated over a small portion of their bodies by narrow seat belts. This enables the occupants to tolerate far more than the 30 G's of stopping force known to be tolerable with seat belts. These advantages can be further accentuated by positioning pads 30 and 31 at distances from the front seat occupants less than the stopping distance of the vehicle during a collision in which the materials in the front bumper are fully compressed. In this way during severe collisions when the occupants are carried forward by inertia at nearly the speed of the vehicle at the start of impact, they strike the crash pads 30 and 31 of the decelerating vehicle before the vehicle completely stops, thus giving the occupants a total decelerating distance equal to the compression stroke of the interior crash pads plus the remaining distance traveled by the vehicle after the occupants strike the crash pads.

There is ample foot room between the lower crash pad 31 and the floor. A connecting mass 32 of padding is located between the lower portion of pad 30 and the upper portion of pad 31. Body elements 33, which can be made of laminate or of any other suitable material, are provided for the purpose of backing up the several pads as shown in FIG. 7. The extra space created by the sloping hood and by moving the crash pads back nearer to the front seat occupants can be used for instrument wiring, steering column, radio, etc., on the driver's side and as a storage compartment 34 extending from a partition 35 (shown in dotted lines) to vehicle body wall 36 on the passenger side, as shown in FIG. 8. For access to storage space 34, two or three segments 37 (FIGS. 2 and 8) of the top crash pad 30 are backed with laminate sheets which are attached by hinges to vertical body element 33 so that these segments can be swung upwardly to uncover a large access opening in element 33.

Instruments 40 on the driver's side are recessed and float in a recessed portion 41 of the crash pad 30. This recessed portion provides room for the driver to operate the steering wheel 42 which is preferably collapsible. On the steering wheel 42 is mounted a helmet-shaped mass 43 of padding which rotates with the steering wheel except during impact when it is momentarily crushed, along with the steering wheel, into portion 41 of pad 30, giving the driver a deceleration distance which includes the combined compressions of masses 41 and 43. If desired the fore-and-aft thickness of the helmet-shaped padding mass 43 can be considerably reduced for greater convenience in operating the steering wheel but with corresponding sacrifice of shock-absorbing capability.

For additional reduction of impact forces transmitted to vehicle occupants, stretchable elastic seat belts can be used instead of the present conventional non-stretchable belts. The present conventional unstretchable seat belts, if duly fastened at the time of a collision occurring at the higher range of collision speeds which can be made tolerable by the invention, would exert unnecessarily heavy G forces on the vehicle occupants and severe pressures over relatively small portions of their bodies, and would not permit utilization of the interior crash pads provided in the invention to help decelerate the occupants. By contrast, the stretchable seat belts, if fastened, exert gentler pressures on the occupants, and their stretching allows the occupants to be further decelerated by the crash pads of the invention during severe collisions.

A child standing or kneeling on the front seat and leaning against the upper crash pad 30, a child or an adult whose safety belt is not fastened and who is thrown against the crash pad assembly by braking just before a collision, or any person who in anticipation of a frontal collision leans forward against the pad would be gradually decelerated over the total distance of the entire compression strokes of the front bumper, the laminate body and the interior crash pad, greatly reducing G forces exerted on such a person during the collision.

Desirably, padding is provided on the backs of the front seats, on the inside faces of the side walls of the vehicle, on door posts, etc., of the vehicle, for protection of rear seat occupants and for protection of all occupants during lateral collisions. The G forces generated by the bumpers of the safety vehicles in lateral collisions and in back-to-front collisions are generally less than the G forces generated during a head-on collision against a hard immovable object or with a vehicle of the same weight moving in the opposite direction at any given rate of collision speed, and vehicle velocity changes tend to be only half as great. Also, because of the low-rebound characteristics of the preferred materials in the vehicle bumpers and bodies of the invention, changes in velocities of vehicles in lateral or back-to-front collisions approach being only half as great as the initial speed of impact. Therefore the thickness of the interior padding just mentioned can be approximately one-fourth of the thickness of the masses of padding constituting front interior crash pads 30 and 31, generally without risking higher G forces being delivered to occupants in lateral collisions.

The thickness of upholstery foam now being used in the vertical portions of conventional vehicle seats, being compressed by the inertia of the occupants simultaneously with the relatively moderate acceleration of the vehicle hit during a back-to-front collision, gives the vehicle occupants less than half the G forces delivered in head-on collisions at the same speed.

4. Calculations and Testing

Sample calculations of maximum damage-free, injury-free collision speeds theoretically attainable, average G forces required at such speeds, and time intervals ($t$) of decelerations based on 75 percent compression of the padding 11 and 14 in the front safety bumper 2 or the front crash pads 30 and 31 alone, disregarding any further compression of the padding, any compressions, bending, denting or crushing of the laminates in the bumper and the body, or any simultaneous compression of interior crash padding while the vehicle is decelerating, are shown below.

Also shown below is a table of results from impact testing of samples of two commercially available types ("Ensolite" AA and LDAF) of the preferred padding material at various impact speeds. The impact test equipment used to determine the compression resistance and the energy absorption of the cellular shock-absorbing materials tested for suitablility for use in the safety bumpers and in the interior crash pads and the G's generated during impact consisted essentially of a cylindrical impact head of greater diameter than the cylindrical samples of cellular material tested, a horizontal pneumatic cylinder to accelerate this impact head and associated inertial system to a desired horizontal velocity, a rigid vertical back plate to support a cylindrical test sample disposed with its axis horizontal and coaxial with the impact head, means for admitting compressed air to the cylinder to drive the impact head toward the sample, means for venting the pneumatic cylinder at a suitable point before the impact head reaches the sample thereby permitting the impact head and inertial system to coast freely into contact with the test sample, and instrumentation for measuring and recording the acceleration and position of the impact head as functions of time during impact. Impact velocity data are obtained from the slope of the position record. The impact energy is calculated from the weight and impact velocity of the inertial system. G's and dynamic compression resistances are calculated from the acceleration measurements. Rebound energy retransmitted to the impact head and inertial system is calculated from the velocity of the impact head measured at the point when the rebound acceleration drops to zero.

The impact head and associated inertial system weighed 17 pounds. The thickness (longitudinal) of the samples tested was approximately 3 inches. The diameter of the samples tested for safety bumper application was approximately 1.64 inches, and the diameter of the samples tested for interior padding application was approximately 2.69 inches. These dimensions were selected in order to facilitate calculation, by means of scaling formulas, of the G levels and impact time intervals which would occur during head-on collisions at typical highway speeds involving twelve-inch-thick safety bumpers and 12-inch-thick interior padding, vehicle weights of approximately 2 pounds per square inch of bumper frontal area, and human body weights of approximately 0.75 pound per square inch of contact area between the interior padding and the human body. However, since the longitudinal thickness of the padding samples exceeded their diameters, since there was no penetration of the crash pad samples tested, and since some small movement of the back plate occurred during impacts, the test impacts encountered somewhat less than the full compression resistances the materials would exert in highway collisions. Also rebound energy measurements reached higher percentages of impact energy than are generally measured when steel ball bearings are dropped on the material.

These theoretical calculations and test results are also conservative because they are based on the pessimistic assumption that the vehicle equipped with the front safety bumper and front interior crash pads of the invention is either striking a hard, immovable object or colliding head-on with another vehicle of similar weight and equipped with a similar safety bumper and moving at the same speed but in the opposite direction. Collisions with soft or movable stationary objects including stationary vehicles would be damage-free and injury-free at higher crash speeds than indicated by these calculations and tests.

SAMPLE THEORETICAL CALCULATION FOR HEAD-ON COLLISIONS

Assuming maximum average deceleration 80 G's ($a/g = 80$):

1. Safety bumper thickness 12 inches, normal compression stroke 9 inches:
   $V = 2$ a $s = 2 \times 80$ gs $= 2 \times 80 \times 32.2 \times 9/12 = 3,860$
   $V = 62$ ft./sec/ $= 42$ mph maximum tolerable collision speed.
   $t = V/a = 62/80 \times 32.2 = 0.024$ seconds duration of impact.
2. Safety bumper thickness 18 inches, normal compression stroke 13.5 inches:
   $V^2 = 2as = 2 \times 80$ gs $= 2 \times 32.2 \times 13.5/12 = 5,800$
   $V = 76$ ft./sec. $= 52$ mph maximum tolerable collision speed.
   $t = V/a = 76/80 \times 32.2 = 0.03$ seconds duration of impact.

Assuming maximum average deceleration 40 G's ($a/g = 40$):

1. Safety bumper 12 inches thick (9 inch stroke) could stop collision at 30 mph in 0.034 seconds.
2. Safety bumper 18 inches thick (13.5 inch stroke) could stop collision at 37 mph in 0.042 seconds.

Assuming that a safety vehicle with laminate body and without conventional bumpers, grillwork, etc., weighs 2,750 lbs. and that its safety bumper frontal area is 1,375 square inches (say 5 feet × 2 feet × 144 minus headlight clearance), the vehicle weight relative to safety bumper frontal area would be 2 lbs. per square inch. A similar ratio would apply for larger or smaller vehicles. Then:

1. Deceleration of 80 G's would require bumper padding compression resistance of $F = ma = W/g \times Gg = 2 \times 80 = 160$ lbs. per square inch.
2. Deceleration of 40 G's would require bumper padding compression resistance of $2 \times 40 = 80$ lbs. per square inch.

Assuming a person weighing 170 lbs. is stopped or accelerated by bumper padding or by interior crash pads utilizing a contact area of 227 square inches, the person's weight relative to his padding contact area would be 0.75 lbs. per square inch. Then:

1. Deceleration or acceleration of 80 G's would require padding compression resistance of 60 lbs. per square inch.

2. Deceleration or acceleration of 40 G's would require padding compression of 30 lbs. per square inch.

cupants at the collision speeds used in the foregoing calculations and impact tests are generally reduced to levels which do not cause serious injury.

RESULTS FROM IMPACT TESTING OF SAMPLES: (COMPRESSION DATA INCLUDES SOME SMALL MOVEMENT OF BACK PLATE). WEIGHT OF FLAT-HEADED INITIAL SYSTEM: 17 LBS. IMPACT VELOCITIES AND DECELERATIONS SCALED 1 TO 4

| Type of ensolite in sample | Number of previous impacts sustained | Diameter of sample (inches) | Initial thickness (inches) | Percent maximum compression during impact* (percent) | Impact velocity (ft./sec.) | Maximum deceleration rate (peak G's) (G's) | Highway collision velocity equivalent (m.p.h.) | Highway maximum G's equivalent (peak G's) (G's) | Duration of impact compression (t) (sec.) | Rebound energy percent to impact energy (percent) |
|---|---|---|---|---|---|---|---|---|---|---|
| Tests scaled to 12" bumper: | | | | | | | | | | |
| AA | 0 | 1.656 | 3.340 | 54 | 5.84 | 4.5 | 16 | 18 | .051 | 15 |
| AA | 1 | 1.656 | 3.272 | 70 | 8.70 | 14 | 24 | 56 | .042 | 16 |
| AA | 2 | 1.656 | 3.210 | 78 | 12.20 | 50 | 33 | 200 | .034 | 22 |
| LDAF | 0 | 1.578 | 3.229 | 36 | 6.62 | 8 | 18 | 32 | .029 | 8 |
| LDAF | 1 | 1.578 | 3.033 | 57 | 9.10 | 14 | 25 | 56 | .030 | 11 |
| LDAF | 2 | 1.578 | 2.878 | 75 | 12.53 | 22 | 34 | 88 | .027 | 13 |
| LDAF | 3 | 1.578 | 2.735 | 83 | 16.84 | 90 | 46 | 360 | .022 | 12 |
| LDAF | 0 | 1.687 | 3.270 | 44 | 7.76 | 10 | 21 | 40 | .031 | 7 |
| LDAF | 0 | 1.672 | 3.238 | 72 | 12.13 | 30 | 33 | 120 | .032 | 11 |
| LDAF | 1 | 1.672 | 2.918 | 72 | 12.13 | 40 | 33 | 160 | .028 | 15 |
| LDAF | h 2 | 1.672 | 2.920 | 75 | 12.34 | 40 | 34 | 160 | .028 | 14 |
| Tests scaled to 12" interior crash pad: | | | | | | | | | | |
| AA | 0 | 2.656 | 3.448 | 34 | 5.60 | 7 | 15 | 28 | .035 | 18 |
| AA | 1 | 2.656 | 3.412 | 51 | 8.06 | 14 | 22 | 56 | .036 | 20 |
| AA | 2 | 2.656 | 3.390 | 68 | 12.13 | 38 | 33 | 152 | .031 | 23 |
| AA | 3 | 2.656 | 3.367 | 76 | 15.25 | 69 | 42 | 276 | .028 | 31 | h Heated in oven to approximately 150 degrees fahrenheit before third impact.
*Percent to original thickness before first impact.

As will be seen from the foregoing theoretical calculations, average G forces of 80 are sufficient to stop vehicles in head-on collisions occurring at 42 miles per hour with 12-inch-thick padding and occurring at 52 miles per hour with 18-inch-thick padding. As will be seen from the foregoing test results, already available padding materials, if they were used in bumpers and crash pads only 12 inches thick, would keep peak G's from greatly exceeding 80 at highway collision speeds up to about 30 mph. Padding materials selected, modified, and used in the best combinations after even more extensive testing can be expected to further improve the good collision performances indicated by the foregoing test results. The time intervals during which average G's of 80 or higher are exerted will be less than 0.025 seconds with 12-inch-thick padding and less than 0.03 second with 18-inch-thick padding, and any peak G's exceeding 80 will last for much shorter time periods. Similar G forces would be exerted for similar time periods on a vehicle occupant striking the front crash pads of the invention at the same full head-on collision speeds after the vehicle had completely stopped.

A great amount of data based on voluntary human experiments and accidental collisions, falls and other impacts involving humans, as assembled by NASA and others, indicates that G's below 80 for time intervals below 0.03 second exerted at the angles and positions of people sitting in motor vehicles during head-on collisions are generally survivable. During collisions at various other angles, the front safety bumpers generally exert lower G levels, shorter time intervals of deceleration and acceleration, and smaller changes in speeds of vehicles. G levels are further reduced by rear safety bumpers, by the laminate bodies, by the various interior crash pads, and/or by flexible seat belts, air bags or other interior safety devices. In addition, occupants sitting close to, or voluntarily leaning against, interior crash pads or being thrown into them by the drivers's braking just before impacts will benefit from further reductions of G forces delivered to them. Thus the decelerations and accelerations experienced by vehicle occupants at the collision speeds used in the foregoing calculations and impact tests are generally reduced to levels which do not cause serious injury.

Calculations using typical compression strengths, tensile strengths, and shear strengths of steel and of steel weldings indicate that a steel chassis built at moderate cost to restrain the weights of typical components of the safety vehicle other than the body, engine, and front safety bumper itself, and connected by bolts or welds to its own members and to the components it is intended to restrain, can withstand peak deceleration forces in the magnitude of 80 G's. For example, two straight longitudinal steel members, with cross-sectional metal areas of 1.5 in.$^2$ each consisting of steel having compression strength of 70,000 lbs./in.$^2$ could withstand total longitudinal compressions up to 70,000 $\times$ 1.5 $\times$ 2/80 = 2,630 lbs. at 80 G's of deceleration disregarding any other support. This weight would be distributed over the entire length of such members. Cross members of diagonal members restraining weights of 250 lbs. each at 80 G's of deceleration and held to the longitudinal members by two bolts or welds on each side would need bolts or welds able to hold approximately 250 $\times$ 80/4 = 5,000 lbs. each.

Since steel bolts and welds can have shear strenths and tensile strengths exceeding 50,000 lbs./in.$^2$, they can readily be made to withstand forces of this magnitude.

Likewise, with reference to the embodiment of FIGS. 1–5, calculations indicate that the transverse laminate sheet 4 can withstand up to 80 G's of peak forces of decleration exerted against it by the front chassis cross member 7, by the broad bases of engine braces 21 and by the laminate body during head-on collisions, provided adequately broad areas of the laminate sheet are covered by the said chassis cross member and motor brace bases to prevent excessively concentrated pressures on the laminate during such decelerations. Assuming the compression resistance of the laminate sheet 4 within its recovery limits is 250 psi, that the weight of the engine is 250 lbs., and that the weight of the chassis with components attached to it is 2,300 lbs., then the engine brace bases should each have a diameter of at least $2 \times \sqrt{250 \times 80/2 \times 250 \times 3.14} = 7.15$ inches, and a chassis cross member 5 ft. 6 inches long should have a height of $2,300 \times 80/250 \times 66 = 11.1$ inches. If the laminate body and its attachments weigh 200 lbs., then the body should be in contact with the transverse laminate sheet 4 over an area of $200 \times 80/250 = 64$ in.²

A standard commercially produced truck like that indicated by reference numeral 50 in FIG. 11 of the drawings, weighing about 7,500 pounds and having its cab 51 and fenders 52 formed of the laminate, was equipped with a front safety bumper 53 made in accordance with this invention. The safety bumper (FIG. 12) 53 consisted of a 1 inch thick sheet 54 of the laminate flat across the front of the truck and having its ends rounded as shown for additional protection, provided with a 6-inch-thick mass 55 of a type of the preferred padding material comprising a chemically blown closed cell mixture of approximately 51 percent polyvinyl chloride, 40.5% NBR and 8.5 percent plasticizer. Padding mass 55 was shaped to conform with laminate sheet bumper 56 which, in turn, was shaped to conform with the standard sheet steel bumper 56 with which the truck was equipped. The safety bumper 53 was mounted on the exsiting truck bumper 56 in this particular case because bumper 56 did not extend far in front of the truck cab 51 and because bumper 56 constituted in effect the front transverse chassis member, supporting the bumper of the invention in a manner analogous to the supporting effect of front chassis member 7 in FIGS. 1 and 4.

The steel bumper 56 was mounted on vertical steel supports 57 which were fixedly attached to the ends of longitudinal chassis members 58. The exposed surfaces of the safety bumper 53 were provided with a protective covering layer of polyurethane elastomer indicated by line 59.

The steel bumper 56 was approximately 10 inches high and the safety bumper 53 extended vertically approximately 12 inches below the steel bumper in order to make proper contact with passenger cars. The total frontal area of the safety bumper was approximately 2,200 square inches, representing about 47 percent of the total adjacent front end area of the truck excluding areas devoted to windshields and clearance for headlights and air intake.

The truck so equipped was repeatedly driven into a flat immovable vertical concrete barrier at impact speeds up to 10 miles per hour without damage to the safety bumper or to the truck and without injury to the driver, who reported merely a slight jolting sensation when impact speeds reached 10 miles per hour. These results were obtained even though the safety bumper had only a relatively small transverse area and incorporated padding only 6 inches thick.

The standard truck used in these tests did not have a chassis which was unusually heavy relative to the weights of the rear wheel and differential assembly, engine, fuel tank, and other components of the truck or relative to its own length. The lack of damage or injury in these full-scale crash tests tended to confirm the foregoing calculations and laboratory impact testing results and also to demonstrate that vehicles incorporating safety bumpers made according to the invention can withstand repeated collisions with chassis and other components built at moderate cost.

6. Characteristics of Preferred Padding Material

As indicated above, the preferred kinds of padding used in the invention are shock-absorbing unicellular blends of thermoplastic resin, NBR and plasticizer sold under the trademark "Ensolite." The discussion in this section of the specification is specifically directed to such preferred padding materials. The advantages of this kind of material over various other shock-absorbing materials which might be used include the following:

a. The compression resistance of the material during the first 5 to 10 percent or so of compression is generally low enough to permit it to conform closely to varied shapes of the human anatomy or other objects striking it or struck by it so that injury or damage during this portion of the stroke is avoided, and during the rest of the stroke nearly equal compression resistance is exerted over the entire contact area, reducing the chances of injury or damage.

b. The material, with the possible exception of "Ensolite" Type LDAF, the dynamic 25 percent compression resistance of which may exceed 50 psi, decelerates or accelerates human bodies in distances no greater than the stroke lengths of the bumpers or of the interior crash pads of the invention with compression resistances which in terms of pressure (lbs. per square inch) are generally moderate enough to be harmless to the anatomy. This property means that pedestrians, cyclists, animals, and vehicle occupants can generally be stopped with impact-resisting pressures gentle enough to save them from death or serious injury.

c. The material tends to compress slowly. Its compression resistance is greater against fast compression than against slow compression. This property of the material apparently arises from its viscoelastic properties and inertia and from its closed-cell structure with gas confined inside the cells. (The momentarily undissipated heat generated in a rapidly compressed confined gas raises its temperature and compression resistance at any given stage of compression above what they would be during slow compression.) Thus a piece of the material adjusts automatically so as to exert less force and give more moderate shocks to vehicles, people, and animals in lower-speed collisions, lateral collisions, back-to-front collisions, collision impacts involving more than one mass of shock-absorbing materials, and bumper impacts with relatively light-weight objects (light-weight relative to bumper-contact areas) such as the anatomies of people and animals. By contrast, a piece of shock-absorbing foam having relatively uniform compression resistance in both slow and fast compressions and designed to stop high-speed impacts with forces near to survival limits of people and vehicles during head-on collisions would exert greater force than the preferred material to stop impacts during low-speed collisions, lateral collisions, back-to-front collisions, collision impacts involving other masses of shock-absorbing materials, and bumper impacts with light weight objects, giving vehicles, people and animals greater shocks. If designed to utilize more of its thickness to stop low-speed impacts with more moderate forces, the latter type of foam would exert higher peak G's in stopping the high-speed impacts.

d. During impacts at moderate highway speeds the material's compression resistance stays roughly constant after a quick initial build-up, not rising sharply until after about 65 percent compression. This means that most impacts can be stopped smoothly, with relatively moderate impactresisting forces relative to the weights involved (moderate G's). Stated another way, the material can absorb unusually larger amounts of kinetic energy during impacts without exceeding G levels which can be tolerated by people and vehicles during the deceleration or acceleration times required.

e. After approximately 60–75 percent compression, the material brings into play an increasingly strong reserve of compression resistance which increases smoothly to very high resistances in the ultimate stages of the most violent collisions when the closed cells and confined gas of the material are compressed severely, saving vehicles and people from the destruction of an abrupt final stop.

f. The average dynamic compression resistance of the material relative to its weight or volume can be made several times that of open-cell flexible foams such as rubber latex foam. Thus safety bumpers and crash pads made from the material in convenient dimensions and weights can handle higher-speed collisions than open-cell flexible foam could handle.

g. During crashes the material's tensile strength, ranging from 90 to more than 150 psi for the various preferred types, combined with a related build-up of diagonal compression resistance from material being compressed beneath the stretched material around narrow areas of impact, causes narrow objects such as metal bumpers or trees to encounter more compression resistance per square inch of their surface areas than is encountered by a flat surface covering the entire area of a bumper made in accordance with the invention. The deeper the penetration, the stronger this extra resistance to narrow objects becomes. The tensile strength and diagonal compression resistance also spread out the impact forces from narrow objects before they reach the sheets of laminate placed behind the material.

h. The material is slow to rebound after impact and generally delivers rebound energy of less than 25 percent of impact energy absorbed, thus reducing rebound shocks and reducing secondary collisions to vehicles, people and animals, and reducing changes in vehicle velocities during collisions toward an optium of half what they would be with full padding rebounds, thus helping to reduce all interior crash pad thickness requirements by up to 75 percent. It is believed that the slow rebound is due to the content of PVC, which is fully compatible with the NBR (nitrile rubber) and the plasticizer(s), and that this quality is not obtainable at low cost using flexible sponges made of fast-rebounding polymers not compatible with (and therefore not useable in admixture with) PVC or with other low-cost resins having equivalent properties.

i. In off-center collisions, the material's tensile strength and related diagonal compression resistance give extra compression resistance at the inside edge of the area of impact, and its flexibility allows the floating laminate sheet to tip toward the side of the impact, helping in both ways to convert head-on collisions into sliding collisions which reduce impact forces as described earlier.

j. The compression resistance of the material increases in cold weather. This property could be considered an advantage because it automatically increases shock-absorbing capacity for the ice-covered roads and poorer braking conditions encountered in winter, and also can improve a bumper's performance in high-speed head-on collisions, off-center collisions and collisions against narrow objects such as trees. Low temperature laboratory impact testing indicates that cold weather dynamic compressions resistance of the material can reach excessive levels in extremely cold weather. However, variations in the material formulation, or even substitution of a different padding material (in alternate plies, for example), can moderate this property if deemed necessary.

k. The material is made in various degrees of impact resistance, and different types have different compressions resistance characteristics. This makes for easy "tailoring" of bumpers and interior crash pads by using combinations of different types to minimize vehicle damage and minimize injuries to pedestrians, cyclists, animals, and vehicle occupants in various kinds of collisions with various kinds of vehicles.

l. The material recovers most of its shape after impact, and can be further restored when necessary by heating to temperatures in the magnitude of 150° F. The material does not tear apart easily, and can be cheaply coated with PVC or other protective surfaces for high weather resistance, abrasion resistance, toughness, and slipperiness. Its closed-cell structure does not absorb water so that rain and dampness present no problem. The material can withstand flexing without damage at extremely low temperatures and is fire-retardant. It has low gas permeability and does not lose its internal gas pressure when heated, as when left in the hot sun. Thus the safety bumper itself is not likely to be damaged by accidents or severe weather conditions. Most other materials lack one or more of the foregoing properties.

m. Because of its light weight relative to its dynamic impact resistance, its extra impact resistance against narrow objects, its damage resistance, and its flexibility, the material in safety bumpers requires no heavy or complicated frontal barriers, supports, or back-up mechanisms. Thus it helps to reduce braking distances, frequency of collisions, collision speeds, forces of impact, gasoline consumption, and vehicle production costs.

n. Relative to the energy absorbed during compression within acceptable limits of peak G's of deceleration, the material is low in cost. For example, it costs less than, and is superior to, various other cellular polymeric materials used for shock absorption and less than well-known types of metal shock absorbers for equivalent energy absorption within desired peak G limits and desired vehicle dimensions.

o. The material as used in the safety system of the invention is effective in off-center collisions and collisions from many angles, whereas metal shock absorbers are limited in this respect. To handle such collisions, multiple shock absorbers with expensive, heavy coordinating mechanisms become necessary.

p. Chiefly as a result of properties described above, the material has demonstrated its ability, both in laboratory testing and in commercial use, to stop various types of impacts with significantly less peak G's than is the case with many other kinds of shock-absorbent foam materials and without any serious rebound shock or secondary shock.

There have been reported cases of live people falling from upper storey windows and from aircraft and landing flat in flower beds or other soft earth uninjured, even though G's in the magnitudes of 200 to 500 probably were exerted. The extensive data collected and analyzed by NASA includes cases where humans have survived impact G's beyond 200. In addition to G's, time duration of G's and direction of force, the contour, deformation, and rebound characteristics of the impact-absorbing device or material involved have been found to be important determinants of the degree of injury sustained. Somewhat analogously, raw eggs dropped from buildings and hitting one-inch sheets of the preferred padding material at 55 mph have survived with shells and yokes unbroken, even though they must have endured more than 1,600 G's of force. Plastic replicas of human heads have been catapulted against heavy steel plates covered with 4 inch layers of the preferred material at 70 mph (enduring at least 660 G's of stopping force) without damage. The preferred material is the official boxing-ring platform material in the State of New York, and no serious head injuries by contact with platforms have been reported since it was adopted. The material is used as the underlay in artificial turf used in football fields and is widely used for gym mats, athletic equipment, crash helmets, etc. Although the forgoing facts have been generally known, it has never occurred to those skilled in the art to use the preferred material in the ways contemplated by the present invention and thereby greatly reduce damage, injuries and deaths from motor vehicle collisions.

The properties of the material in comparison with the properties of alternatives which might be considered are set forth in the following table:

| | | Preferred Material | Flexible Open-Cell Sponges | Rigid Foams | Metal-Liquid Shock Absorbers |
|---|---|---|---|---|---|
| (a) | Initial soft compression resistance. | Yes | Yes | No | No |
| (b) | Moderate impact pressures. | Yes | Yes | Possible | No |
| (c) | Adjusts for fast or slow impacts. | Yes | Possible | Possible | Yes |
| (d) | Constant resistance through most of impact. | Yes | No | Yes | Yes |
| (e) | Smoothly rising resistance at end of impact compression. | Yes | Possible | Possible | Possible |
| (f) | Adequate for higher speed impacts. | Yes | No | Possible | Not yet |
| (g) | Extra resistance pressure to narrow objects. | Yes | Yes | Some | Yes |
| (h) | Slow rebound (or none). | Yes | No | Yes | Yes |
| (i) | Extra impact resistance and sliding in off-center collisions. | Yes | Yes | Some | Not readily |
| (j) | Compression resistance greater in winter. | Yes | Maybe | Maybe | Yes |
| (k) | Various types available. | Yes | Yes | Yes | Yes |
| (l) | Recovers shape and resists damage. | Yes | No | No | At low speeds only |
| (m) | Minimizes total vehicle weight. | Yes | No | Yes | No |
| (n) | Low cost | Yes | Yes | Yes | No |
| (o) | Handles off-center and angular collisions | Yes | Yes | Somewhat | No |
| (p) | Outstanding shock absorption already demonstrated. | Yes | No | In some cases | At low speeds |

7. Characteristics of Preferred Laminate

The preferred laminate is a rigid but bendable, shock-absorbing, impact-resistant, thermoformable laminate having a rigid unicellular ABS core and having integrally bonded to this core on each side thereof one or more substrate layers of solid ABS thermoplastic material and one or more skin layers of thermoplastic material bonded to the substrate layers such as are described in detail in the several patents and publications cited in the above definition of "laminate." It has long been commercially available and widely used with the result that its advantageous properties in terms of impact strength, recovery, repairability, ease of fabrication, etc., have been amply demonstrated. The advantages of the preferred laminate over other materials which might be considered for use in the safety bumpers or vehicle bodies or fenders include the following:

a. Greater rigidity relative to weight than steel, polyester-fiberglass, aluminum, etc. — crucial for the safety bumper described herein. High-quality plywood has up to 25 percent greater stiffness-to-weight than the preferred laminate, but lacks impact resistance and shatters, splits, and splinters under severe impact.

b. Great flexural strength requiring less reinforcement than other structural materials — crucial for the safety bumpers, bodies and fenders.

c. Greater impact resistance relative to weight than any of the aforementioned materials, as a result of the ABS resins contained in the substrate layers and core of the preferred laminate plus the nitgrogen-filled closed cell structure of the core, in which each cell acts as an energy-absorbing center for the impact loading. Fender and body damage on big Diamond Reo (trademark), White (trademark), and International Harvester (trademark) trucks operating commercially with fenders and cabs made from the preferred laminate has been negligible. Cars with bodies made from it have been driven at 30 mph through brick walls without body damage. A strong man with a sledge hammer has difficulty making a dent in a fender made from this laminate. A logging truck whose metal cab was crushed when it rolled over suffered only minor damage to the hood and fenders made of the laminate, saving the driver from injury. This high resistance of the preferred laminate to both lateral and longitudinal impacts is important for the safety bumpers, for the body connected directly to the safety bumpers, for reduction of dents and other damage to fenders and body, and for protection of vehicle occupants.

d. Ability to bend and compress slightly and ultimately dent and crush under extreme impact both laterally and longitudinally, thus reducing forces of impact delivered to vehicle frames, engines, and other components, reducing stresses on the connections between frame, body, engine, etc., and protecting vehicle occupants from excessive shocks and from collapse of vehicle bodies during collisions or capsizing accidents.

e. Slow recovery from bending and compression even within elastic limits, which reduces rebound shocks, secondary collisions, and vehicle velocity changes.

f. Does not shatter or splinter even during extremely severe crashes. Makes no flying fragments, jagged edges, or splinters as do the aforementioned materials.

g. Dents in the preferred laminate are easily repaired by aiming a cheap electric heat gun at the dent, which simply pops back into place with assistance from re-expansion of the gas in each of the closed cells upon heating. Often dents repair themselves after a few hours without any work being done on them. Blemishes are washed off with soap and water. Holes from extremely violent impacts can be easily patched with epoxy compounds.

h. The light weight of bodies, fenders, and bumper components made of the preferred laminate reduces motor vehicle weights, reducing collision impact forces as well as gasoline consumption and automotive production costs.

i. Like the preferred padding material, the preferred laminate becomes stronger in cold weather, automatically tending to compensate for slippery roads and poor braking conditions, and substantially maintains its desirable characteristics over a wide range of temperatures beyond those commonly encountered by motor vehicles.

j. The preferred laminate is readily formable by conventional thermoforming operation such as vacuum drawing or any other thermal forming techniques such as those described in the aforementioned brochure entitled "Royalex ABS: properties and uses" and in the book "Plastic Sheet Forming" by Butzko, published 1958 by Reinhold. This formability depends on the unicellular construction of the core which prevents collapse of the individual closed cells during stretching and forming at elevated temperatures as well as upon the fact that its cover layers are thermoplastic and heat-formable. Since both the core 23 and the substrate layers 24 (which are disposed on each side of the core and constitute important elements of the cover layers) are both made from ABS they have identical or closely similar thermoplastic characteristics which cause them to exhibit like heat-drawing and -forming behavior; the outer skin layers 25 are thermoplastic also but are usually so thin that even when they are not made of ABS they follow the movement of the core and substrate layers during forming. Thus because the core is made of ABS and has a closed cell structure it behaves as if it were a homogeneous or non-cellular material in the drawing step and stretches and thins out in unison with the cover layers.

8. Preferred Laminate and Padding Materials

Both the preferred laminate, e.g., "Royalex" sheet and the preferred padding material, e.g., shock-absorbing forms of "Ensolite" are lightweight and easy to cut, laminate, drill, thermoform, attach, cement, coat, etc., and therefore lend themselves to low-cost commercial production of vehicles incorporating the safety system described herein. Initial investments for tooling, molds, and other equipment are very small compared with the investments to produce components out of metal, polyester-fiberglass, or other available material.

GENERAL

It is preferred that the longitudinal thickness of the padding in the front safety bumper of the invention be equal to at least 4 inches and that its maximum transverse area be equal to at least 40 percent of the adjacent end area of the vehicle as defined above. In the case of the rear safety bumper, the longitudinal thickness is preferably equal to at least 2 inches and the maximum transverse area is equal to at least 40 percent of the adjacent end area. In the case of a 4-element bumper such as the one shown in FIGS. 1–4 as having two laminate sheets and two masses of padding, the longitudinal thicknesses of the padding masses typically total at least 6 inches.

In some instances, it may be thought desirable to make the outer transverse padding layer of the safety bumper of the invention with undulating or recessed portions so that the total padding thickness would not be uniform. As used herein the terms "thickness" and "longitudinal thickness" are intended to refer to the average thickness of the padding over its entire transverse area.

The ends of the motor vehicle need not be perfectly flat but can be moderately rounded or beveled with certain attendant advantages and disadvantages.

It will be seen that the inner laminate panels of the safety bumpers are reinforced at least by the side portions of the body shell and that the panels are typically additionally reinforced along their upper portions by the upper portions of the body shell. Thus, typically the side and upper portions of the body shell directly abut the side and upper portions of the inner laminate panels. In addition, the lower portions of these panels are reinforced by the transverse chassis members 7 against which they usually directly abut. The result is that the body shell, and preferably the chassis as well, act in concert with one or both of the safety bumpers in absorbing the energy of collisions; this cooperative effect is achieved to the best advantage when both these panels and the body shell are made from the laminate.

Since the rigid inner laminate sheets 4 and 5 of the safety bumpers are themselves fixedly mounted (in any suitable way as by mechanical attaching means or by solvent welding where laminate is joined to laminate) on the truncated ends of the body and chassis, the bumpers become in effect parts of the body and chassis. As a consequence, the safety bumper is able to directly and sumultaneously decelerate or accelerate both the body and the chassis, and heavy internal components of the vehicle as well where longitudinal bracing, such as braces 21, is provided. Conversely, the outward forces exerted by the decelerating or accelerating body, engine, and other braced internal components are distributed more broadly over the inner faces of laminates 4 and 5 during collisions and also help to stabilize the bumpers. The use of these damage-resistant, shock-absorbing, slowly recovering components together in the manner described also enables the interior crash pads to operate with maximum effectiveness in reducing injuries.

While no provision for cooling the engine of the vehicle is shown in the drawings or described in the foregoing, those skilled in the art can readily provide suitable means for accomplishing such cooling. Thus any suitable means can be used for drawing cooling air into and around the engine where it is air-cooled or through the radiator of a liquid-cooled engine. Air intakes or scoops can be provided in the hood or in the sides of the body shell or even at the bottom of the vehicle or through a longitudinal hole or holes in the front bumper.

The safety system of the invention can be used, if desired, in combination with other known safety-enhancing and damage-reducing systems or devices such as safety belts, inflatable air bags in the passenger compartments, metal hydraulic shock absorbers (which could if desired be positioned between the floating laminate sheet of a safety bumper of the invention and the chassis, engine block or other heavy internal components of the vehicle), clear plastic windshields and windows, etc.

The effectiveness of the safety bumpers of the invention can be increased by providing separate means to give heavy portions of the vehicle or heavy contents thereof additional deceleration or acceleration distances during collisions, thus reducing the force to be exerted by the safety bumpers to decelerate or accelerate the entire vehicle and contents. For example, longitudinal metal hydraulic shock-absorbers can be fastened to the chassis of a truck tractor and braced against a longitudinally sliding component which in turn supports the front end of the truck trailer, in order to permit the trailer to move forward relative to the tractor during collisions. Likewise a vertical transverse layer of padding can be provided inside truck bodies and trailers between the front end of the load and the front end of the body or trailer.

The automotive safety system of the invention can prevent damage and injuries at relatively high collision speeds without being destroyed or severely damaged itself and thus without becoming a significant part of vehicle repairs. By contrast, other automotive safety systems reported up to now themselves often become damaged at speeds exceeding 5 to 30 mph, adding greatly to repair bills.

While the aforementioned shock-absorbing unicellular blends of resin, nitrile rubber and plasticizer(s), such as those known as "Ensolite," are the materials of first choice for the padding used in the safety bumpers and interior crash pads of the invention, other cellular, shock-absorbing polymeric materials having similar properties to an acceptable degree but not unduly sacrificing other desirable qualities and not having excessive costs, can be used in lieu thereof.

While it is preferred that the fixed and floating sheets of the safety bumpers and the body of the vehicle both be made from the laminate described above, the material from which the sheets or the body or both are made can with some disadvantages be replaced with other sheet materials having stiffness, flexibility, compressibility, compression resistance, slow rebound, ability to recover shape after impacts, resistance to delamination, ease of processing and fabricating, and ease of repairing to degrees which are acceptable if the cost of such materials is low enough. A good example of such a possible substitute material is a sandwich sheet construction consisting of solid ABS sheets bonded to a rigid closed cell polyurethane foam core, described in *Chemical & Engineering News*, Oct. 13, 1969, pages 50–51. A possibility for the bumpers only might be high grade plywood but it is subject to certain serious shortcomings mentioned above.

Those skilled in the art will, of course, appreciate that care must be exercised in the selection of particular materials used in the safety bumpers, body and interior crash pads. For example the type of shock-absorbing material known as "Ensolite" Type LDAF has relatively high compression resistance and therefore should be used with caution in the interior crash pads and in the outer portions of bumpers which are likely to strike people or animals. The teachings of the foregoing specification will sufficiently apprise those skilled in the art how to design a motor vehicle embodying the principles of the present invention.

Those skilled in the art will also appreciate that the different conditions to which the padding used in the safety bumpers of the invention and the padding of the interior crash pads are exposed often dictate somewhat different physical properties for these materials. Thus, the dynamic compression resistance required for the padding used in the interior crash pads is normally somewhat less than is required for the padding used in the safety bumpers. Also the tensile strength of the padding used in the interior crash pads is not necessarily as great as that which is desirable in the bumper padding to resist tearing and to help resist impacts from collisions with narrow objects such as trees and metal bumpers. While the tensile strength of the padding in the crash pads might be as low as 15 pounds per square inch, for the bumpers it is preferred, but not essential, that it be at least 50 pounds per square inch. Again, since the bumper padding is more likely to be exposed to the elements than are the interior crash pads, it is desirable that the bumper padding have a water absorption value not over 1 pound per square foot of cut surface; such a requirement is not essential for the padding from which the interior crash pads are made.

Limited laboratory impact testing indicates that the effectivenss of the interior crash padding and bumper padding can be substantially improved by using combinations of different types of padding materials in various layers. For example, locating a layer of a softer type of the preferred padding material such as Ensolite AA on the impact surfaces of the padding can materially reduce the initial G's and the initial pressures exerted on human or animal anatomies. Laboratory impact tests scaled according to principles described above indicate that an interior crash pad of the invention 12 inches thick made of a stiffer type of the preferred padding material, Ensolite LDAF, can stop a human anatomy impacting at 35.6 mph and 41 mph with peak G's of only 92 and 136 respectively. Comparison of these test results with test results using Ensolite AA scaled for crash pads, such as the results shown in the table above, indicates that a crash pad incorporating Ensolite LDAF can reduce peak G's substantially at the higher impact speeds. Thus a composite interior crash pad incorporating transverse layers of Ensolite LDAF and Ensolite AA can be expected to offer substantial advantages over a crash pad consisting entirely of Ensolite AA or entirely of Ensolite LDAF. The foregoing tests did not include penetrating impacts such as occur when parts of the anatomy strike padding, but if penetration produces undesirably high G forces due to the tensile strength of the padding, this tensile strength could be reduced by slicing the padding longitudinally into sections.

Other laboratory impact tests scaled for bumpers as described earlier but using two transverse layers of Ensolite LDAF in combination with one transverse layer of Ensolite AA (i.e., 66.7% LDAF) indicate that a bumper of the invention 12 inches thick incorporating this combination of materials can stop a passenger car of the invention in head-on collisions occurring at 28 mph, 34 mph, and 39.6 mph with peak G's of only 44, 96, and 176 respectively. Comparison of these test results with limited numbers of other test results obtained using 100 percent Ensolite LDAF scaled for bumpers, such as those shown in the table above, indicates that this combination of Ensolite LDAF and Ensolite AA can reduce peak G's at the higher collision speeds.

The expressions "relatively thin" used in certain of the claims to denote the relatively rigid sheets of the safety bumpers and "relatively thick" used in those claims in describing the padding elements of the bumpers refer to the longitudinal thicknesses of the elements of each group in comparison with the longitudinal thicknesses of the elements of the other group. In practice the thicknesses of the padding elements commonly range from 3 to 20 times the thicknesses of the rigid sheets.

The term "stiff" used in certain of the claims in describing the material from which elements 4, 5, 13, 15 and 54 are formed is used in its commonly accepted meaning to indicate that such material is rather rigid and inflexible although it generally is somewhat bendable under high loading. Preferably such material has a stiffness in flexure ($ET^3/12$) relative to weight per unit of area at least to 50 percent of that shown for laminates in FIG. 9.

The term "Boardy" has its usual and ordinary meaning, namely: not pliable, hard, stiff.

From the foregoing it will be seen that the present invention provides a simple, relatively inexpensive, foolproof but highly effective system for greatly reducing injuries and damage from motor vehicle collisions at speeds higher than those at which previously used or proposed techniques had any effectiveness. The present invention is unique in that it depends for its effectiveness mainly upon types of polymeric materials which have been readily available for a number of years but were never used together in the manner of the invention. In the practice of the invention these well-known materials are utilized in particular novel ways in the construction of the vehicle so that they cooperate to achieve the aforementioned reduction in injuries and damage. The invention involves no heavy, expensive, damage-prone, or hard-to-repair mechanisms. The polymeric components of the safety system of the invention are unusually hard to damage and easy to repair.

While the invention in its preferred form uses the novel safety bumpers in combination with a motor vehicle body made of the laminate and the interior crash pads formed of the padding as described in the foregoing and portrayed in the drawings, in its broader aspects it is not limited thereto but is to be taken as limited only as set forth in the claims appended hereto.

Having thus described my invention, what I claim and desire to protect by Letters Patent is:

1. A motor vehicle bumper comprising the following elements:
   1. A relatively thin sheet of boardy thermoplastic material adopted to be disposed fixedly over a portion of a motor vehicle and comprising a laminate of solid plastic cover layers integrally united to an inner rigid cellular plastic core, said laminate having a stiffness in flexure ($ET^3/12$) relative to weight per unit of area at least equivalent to that shown for laminates in FIG. 9 of the accompanying drawings and an impact resistance such that it shows no break when a 2 lb. steel ball is dropped on it from a height of 9 feet at temperatures ranging from −40°F. to 175°F.,
   2. A relatively thick mass of unicellular shock-absorbing polymeric material disposed on the outer face of said sheet and having the following physical properties:

| | |
|---|---|
| Density | Not over 35 lbs. per cu. ft. |
| 25% Compression Resistance (Dynamic at approximately 25 miles per hour, for 12-inch thickness). | At least 15 lbs. per sq. in. |
| Tensile Strength | At least 15 lbs. per sq. in. |
| Water Absorption (Cut Surface) | Not over 1 lb. per sq. ft. |
| Rebound Energy Delivered | Not more than 35% of impact energy |

3. A second relatively thin sheet of boardy thermoplastic material disposed on the outer face of element (2), said second sheet comprising a laminate responding to the description of the laminate in connection with element (1), and
   4. A second relatively thick mass of unicellular shock-absorbing material disposed on the outer face of element (3), said material having the properties set forth in connection with element (2).

2. A motor vehicle bumper as set forth in claim 1 wherein said unicellular material is a blown compatible blend of thermoplastic resin, NBR and plasticizer in proportions of from 10 percent to 70 percent of said resin, from 16 percent to 80 percent of said NBR and from 8 percent to 60 percent of said plasticizer, said percentages being by weight based on the sum of said constituents and totalling 100 percent.

3. A motor vehicle bumper as set forth in claim 1 which includes a pair of laterally spaced inextensible elements located in the right-hand and left-hand portions of the bumper, each of said elements being fixedly but adjustably attached to the upper portion of element (1) and fixedly attached to the lower portion of element (3), said inextensible elements preventing sagging of element (2).

4. A motor vehicle bumper as set forth in claim 1 comprising inextensible means for preventing significant longitudinal movement of element (3) away from element (1) during off-center collisions or collisions with narrow objects but permitting element (3) to move freely toward element (1) during collisions.

5. A motor vehicle having substantially flattened front and rear ends on which are fixedly mounted front and rear bumpers extending over substantially the entire areas of said front and rear ends, respectively, each of said bumpers comprising the following elements:
   1. A relatively thin sheet of boardy thermoplastic material disposed fixedly over the respective front and rear ends of the motor vehicle and comprising a laminate of solid plastic cover layers integrally united to an inner rigid cellular plastic core, said laminate having a stiffness in flexure ($ET^3/12$) relative to weight per unit of area at least equivalent to that shown for laminates in FIG. 9 of the accompanying drawings and an impact resistance such that it shows no break when a 2 lb. steel ball is dropped on it from a height of 9 feet at temperatures ranging from −40°F. to 175°F.,
   2. A relatively thick mass of unicellular shock-absorbing polymeric material disposed on the outer face of said sheet and having the following physical properties:

| | |
|---|---|
| Density | Not over 35 lbs. per cu. ft. |
| 25% Compression Resistance (Dynamic at approximately 25 miles per hour, for 12-inch thickness). | At least 15 lbs. per sq. in. |
| Tensile Strength | At least 25 lbs. per sq. in. |
| Water Absorption (Cut Surface) | Not over 1 lb. per sq. ft. |
| Rebound Energy Delivered | Not more than 35% of impact energy |

3. A second relatively thin sheet of boardy thermoplastic material disposed on the outer face of element (2), said second sheet comprising a laminate responding to the description of the laminate in connection with element (1), and
   4. A second relatively thick mass of unicellular shock-absorbing material disposed on the outer face of element (3), said material having the properties set forth in connection with element (2).

6. A motor vehicle as set forth in claim 5 wherein said unicellular material is a blown compatible blend of thermoplastic resin, NBR and plasticizer in proportions of from 10 percent to 70 percent of said resin, from 16 percent to 80 percent of said NBR and from 8 percent to 60 percent of said plasticizer, said percentages being by weight based on the sum of said constituents and totalling 100 percent.

7. A motor vehicle as set forth in claim 5 wherein the maximum transverse area of each of said bumpers is equal to at least 50 percent of the maximum projected transverse cross-sectional area of the vehicle including windshield and roof.

8. A motor vehicle at least one end of which is equipped with a safety bumper, said bumper comprising the following elements:
   1. A relatively thin sheet of boardy thermoplastic material disposed fixedly over said end of said vehicle and comprising a laminate of solid plastic cover layers integrally united to an inner rigid cellular plastic core, said laminate having a stiffness in flexure ($ET^3/12$) relative to weight per unit of area at least equivalent to that shown for laminates in FIG. 9 of the accompanying drawings and an impact resistance such that it shows no break when a 2 lb. steel ball is dropped on it from a height of 9 feet at temperatures ranging from −40°F. to 175°F.,
   2. A relatively thick mass of unicellular shock-absorbing polymeric material disposed on the outer face of element (1) and having the following physical properties:

| | |
|---|---|
| Density | Not over 35 lbs. per cu. ft. |
| 25% Compression Resistance (Dynamic at approximately 25 miles per hour, for 12-inch thickness). | At least 10 lbs. per sq. in. |
| Tensile Strength | At least 15 lbs. per sq. in. |
| Water Absorption (Cut Surface) | Not over 1 lb. per sq. ft. |
| Rebound Energy Delivered | Not more than 35% of impact energy |

3. A second relatively thin sheet of boardy thermoplastic material disposed on the outer face of element (2), said second sheet comprising a laminate responding to the description of the laminate in connection with element (1), and
   4. A second relatively thick mass of unicellular shock-absorbing material disposed on the outer face of element (3), said material having the properties set forth in connection with element (2),
   the longitudinal thickness of elements (2) and (4) totalling at least 6 inches and the maximum transverse area of said bumper being equal to at least 40 percent of the end area of the vehicle adjacent to the bumper, excluding from said end area areas devoted to windshields, windows, clearance for lights, and air intakes.

9. A motor vehicle the front end of which is equipped with a safety bumper, said bumper comprising the following elements:
   1. A relatively thin sheet of stiff, somewhat flexible, highly impact-resistant material disposed fixedly over the front end of the vehicle, said material having a stiffness in flexure ($ET^3/12$) relative to weight per unit of area at least 50 percent of that shown for laminates in FIG. 9 of the accompanying drawings, and
   2. A thick mass of cellular, shock-absorbing, polymeric material disposed on the outer face of said sheet, said mass constituting element (2) of said bumper having a longitudinal thickness of at least 4 inches and a maximum transverse area equal to at least 40 percent of the front end area of the vehicle adjacent to the bumper, excluding from said end area areas devoted to windshields, windows, clearance for lights, and air intakes, the longitudinal thickness (T) of said mass of shock-absorbing material being as defined by the following equation:

$$T = WV_1^2/2gAe$$

where $T$ = thickness of said mass in inches,
$W$ = weight of vehicle in pounds,
$V_1$ = intended maximum collision impact speed in feet per second,
$g$ = acceleration (32.2) due to gravity in feet per second,
$A$ = transverse area of said mass in square inches, and
$e$ = energy (expressed in foot pounds per inch$^3$) absorbed by each cubic inch of said mass when compressed to the point where its compression resistance in pounds per square inch of transverse area equals GpW/A where Gp is the allowable peak G's of deceleration and W and A are as above.

10. A motor vehicle the front end of which is equipped with a safety bumper, said bumper comprising the following elements:

1. A relatively thin sheet of stiff, somewhat flexible, highly impact-resistant material disposed fixedly over the front end of the vehicle, said material having a stiffness in flexure (ET$^3$/12) relative to weight per unit of area at least 50 percent of that shown for laminates in FIG. 9 of the accompanying drawings,
2. A thick mass of cellular, shock-absorbing, polymeric material disposed on the outer face of said sheet,
3. A second relatively thin sheet of stiff, somewhat flexible, highly impact-resistant material disposed on the outer face of element (2), said second sheet responding to the description of the sheet constituting element (1), and
4. A second thick mass of cellular, shock-absorbing, polymeric material disposed on the outer face of element (3), said material responding to the description of the material constituting element (2), the longitudinal thickness of elements (2) and (4) totalling at least 6 inches and the maximum transverse area of said bumper being equal to at least 40 percent of the front end of the vehicle adjacent to the bumper, excluding from said area areas devoted to windshields, windows, clearance for lights, and air intakes, the combined longitudinal thickness (T) of the masses constituting elements (4) and (2) being as defined by the following equation:

$$T = WV_1^2/2gAe$$

where $T$ = the combined thickness of said masses in inches,
$W$ = weight of vehicle in pounds,
$V_1$ = intended maximum collision impact speed in feet per second,
$A$ = transverse area of said masses in square inches, and
$e$ = energy (expressed in foot pounds per inch$^3$) absorbed by each cubic inch of said polymeric material when compressed to the pount where the compression resistance in pounds per square inch of transverse area equals GpW/A where Gp is the allowable peak G's of deceleration and W and A are as above.

11. A motor vehicle having both its front and rear ends substantially flattened over areas equal to at least 40 percent of the maximum projected cross-sectional area of the vehicle including windshield and roof, with headlights, taillights and front wheel assembly recessed longitudinally, with conventional grill work, decorative devices, bumper brackets and bumpers eliminated and replaced by safety bumpers comprising masses of cellular, shock-absorbing, polymeric material from 6 to 24 inches thick in the case of the front bumper and from 3 to 12 inches thick in the case of the rear bumper, said masses forming the vehicle exterior surfaces and being substantially co-extensive in area with the aforementioned areas, each of said safety bumpers comprising the following elements:

1. A relatively thin sheet of thermoplastic material disposed fixedly over one of said flattened ends and comprising a laminate of solid plastic cover layers integrally united to an inner rigid cellular plastic core, said laminate having a stiffness in flexure (ET$^3$/12) relative to weight per unit of area at least as great as that shown for laminates in FIG. 9 of the accompanying drawings and an impact resistance such that it shows no break when a 2 lb. steel ball is dropped on it from a height of 9 feet at temperatures ranging from −40°F to 175°F,
2. A relatively thick mass of unicellular shock-absorbing polymeric material disposed on the outer face of said sheet and having the following physical properties:

| | |
|---|---|
| Density | Not over 35 lbs. per cu. ft. |
| 25% Compression Resistance (Dynamic at approximately 25 miles per hour, for 12-inch thickness). | At least 15 lbs. per sq. in. |
| Tensile Strength | At least 15 lbs. per sq. in. |
| Water Absorption (Cut Surface) | Not over 1 lb. per sq. ft. |
| Rebound Energy Delivered | Not more than 35% of impact energy. |

3. A second relatively thin sheet of boardy thermoplastic material disposed on the outer face of element (2), said sheet comprising a laminate responding to the description of the laminate in connection with element (1), and
4. A second relatively thick mass of unicellular shock-absorbing material disposed on the outer face of element (3), said material having the properties set forth in connection with element (2).

12. A motor vehicle having at least one end substantially flattened with headlights and taillights recessed longitudinally and with conventional grill work, decorative devices, bumper brackets and bumpers eliminated at the flattened end and replaced by a safety bumper comprising a laminate of an interior relatively thin sheet of stiff somewhat flexible impact-resistant material braced to the vehicle across the associated end against movement in a longitudinal direction and an exterior relatively thick mass of cellular, shock-absorbing, polymeric material defining an exterior exposed surface extending transversely across said end and having a longitudinal thickness of at least 2 inches and a maximum transverse area equal to at least 40 percent of the adjacent end area of the vehicle, excluding from said end area the areas devoted to windshields, windows, clearance for lights, and air intakes, the longitudinal thickness (T) of said mass of shock-absorbing material being defined by the following equation:

$$T = WV_1^2/2gAe$$

Where
 $T =$ thickness of said mass in inches,
 $W =$ weight of vehicle in pounds,
 $V_1 =$ intended maximum collision impact speed in feet per second,
 $g =$ acceleration (32.2) due to gravity in feet per second,
 $A =$ transverse area of said mass in square inches, and
 $e =$ energy (expressed in foot pounds per cubic inch) absorbed by each cubic inch of said mass when compressed to the point where its compression resistance in pounds per square inch of transverse area equals GpW/A where Gp is the peak allowable G's of deceleration and W and A are as defined above.

13. A motor vehicle having both its front and rear ends substantially flattened over areas equal to at least 40 percent of the maximum cross-sectional area of the vehicle including windshield and roof, and having front and rear bumpers fixedly mounted on and extending over substantially the entire areas of said flattened front and rear ends, each of said bumpers comprising the following elements:

1. A relatively thin sheet of stiff, somewhat flexible, highly impact-resistant material disposed fixedly over the front or rear end of the motor vehicle, said material having a stiffness in flexure ($ET^3/12$) relative to weight per unit of area at least 50 percent of that shown for laminates in FIG. 9 of the accompanying drawings, and 2. A relatively thick mass of cellular, shock-absorbing, polymeric material disposed on the outer face of said sheet comprising the vehicle exterior surface, and laterally spaced fixed metal braces extending generally longitudinally between element (1) of one of said bumpers and the engine of the vehicle.

* * * * *

UNITED STATES PATENT OFFICE
CERTIFICATE OF CORRECTION

Patent No. 3,802,727　　　　　　　　　Dated April 9, 1974

Inventor(s)　　Addison S. Beckley

It is certified that error appears in the above-identified patent and that said Letters Patent are hereby corrected as shown below:

On the cover sheet [21] "Appl. No.: 117,588" should read -- Appl. No.: 117,583 --.

Signed and sealed this 5th day of November 1974.

(SEAL)
Attest:

McCOY M. GIBSON JR.　　　　　　　　C. MARSHALL DANN
Attesting Officer　　　　　　　　　Commissioner of Patents